United States Patent
Liang

(10) Patent No.: US 7,120,572 B1
(45) Date of Patent: Oct. 10, 2006

(54) MEMORY EFFICIENT PROGRAM PRE-EXECUTION VERIFIER AND METHOD

(75) Inventor: Sheng Liang, Cupertino, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/516,406

(22) Filed: Mar. 1, 2000

Related U.S. Application Data

(60) Provisional application No. 60/174,975, filed on Jan. 6, 2000.

(51) Int. Cl.
G06F 9/455 (2006.01)

(52) U.S. Cl. .............................. 703/26; 703/13; 703/22; 703/23; 717/126

(58) Field of Classification Search ................. 703/13, 703/22, 23, 26; 717/126
See application file for complete search history.

(56) References Cited

U.S. PATENT DOCUMENTS

| | | | |
|---|---|---|---|
| 3,878,513 A | 4/1975 | Werner | |
| 4,521,851 A | 6/1985 | Trubisky et al. | |
| 4,524,416 A | 6/1985 | Stanley et al. | |
| 4,622,013 A | 11/1986 | Cerchio | |
| 4,742,215 A | 5/1988 | Daughters et al. | |
| 5,165,465 A | 11/1992 | Kenet | |
| 5,179,734 A | 1/1993 | Candy et al. | |
| 5,187,799 A | 2/1993 | McAuley et al. | |
| 5,220,522 A | 6/1993 | Wilson et al. | |
| 5,283,864 A | 2/1994 | Knowlton | |
| 5,307,499 A | 4/1994 | Yin | |
| 5,347,632 A | 9/1994 | Filepp et al. | |
| 5,422,992 A | 6/1995 | Motoyama et al. | |
| 5,446,875 A | 8/1995 | Ogisu et al. | |
| 5,450,575 A | 9/1995 | Sites | |
| 5,590,329 A | 12/1996 | Goodnow, II et al. | |
| 5,668,999 A | 9/1997 | Gosling | |
| 5,740,441 A | 4/1998 | Yellin et al. | |

FOREIGN PATENT DOCUMENTS

| | | |
|---|---|---|
| EP | 0 424 056 A2 | 10/1990 |
| EP | 0 718 764 A2 | 12/1995 |
| EP | 0 718 764 A2 | 6/1996 |

OTHER PUBLICATIONS

Necula, "Proof-Carrying Code", Proceedings of the 24th ACM SIGPLAN-SIFACT Symposium on Principles of programming Language, 1997, pp. 106-119.*

(Continued)

Primary Examiner—Thai Phan
Assistant Examiner—Herng-der Day
(74) Attorney, Agent, or Firm—Finnegan, Henderson, Farabow, Garrett & Dunner, L.L.P.

(57) ABSTRACT

A program authoring system, prior to distributing a program, preprocesses the program to verify the integrity of the program. The program is written in a language that uses a restricted set of data type specific instructions. The program preprocessor, upon verification of the program's integrity, generates a modified version of the program containing an array of supplemental information. The supplemental information consists of data type snapshots of the program stack and local variables immediately prior to execution of each of a set of identified target instructions, which are successors of conditional jump, unconditional jump, branch and flow control instructions, if any, in the program. In client devices that receive programs, a program verifier verifies the integrity of each received program. The instructions of the program are emulated to determine whether any instruction in the program would violate the data type restrictions for that instruction.

27 Claims, 14 Drawing Sheets

OTHER PUBLICATIONS

Freund et al., "A Formal Framework for the Java Bytecode Language and Verifier", Proceedings of the 14th ACM SIGPLAN Conference on Object-Oriented programming, System, Language, and Applications, 1999, pp. 147-166.*

Grimaud G. et al.: "FACADE: A Typed Intermediate Language Dedicated to Smart Cards", *Software Engineering Notes*, Association for Computing Machinery, New York, US. vol. 24, No. 6, pp. 476-493 (1999).

Adobe System Inc., "*PostScript Language Reference Manual Second Edition*," 1990, pp. 23-143.

Ahamad et al., "*An Application of Name Based Addressing to Low Level Distributed Algorithms*," Jan. 1985, IEEE Transactions On Software Engineering, vol. SE-11, No. 1, p. 59.

Almes et al., "*The Eden System: A Technical Review*," Jan. 1985, IEEE Transactions On Software Engineering, vol. SE-11, No. 1, pp. 43-58.

Almes, Guy. T, "*Integration and Distribution in the Eden System*," Department of Computer Science, University of Washington Seattle, Technical Report 83-01-02, Jan. 19, 1983, pp. 1-18.

Almes, Guy. T, "*The Evolution of the Eden Invocation Mechanism*," Department of Computer Science, University of Washington Seattle, Technical Report 83-01-03, Jan. 19, 1983, pp. 1-14.

Almes, Guy. T, "*Eden Project Proposal*," Department of Computer Science, University of Washington Seattle, Technical Report 80-10-01, Oct. 1980, pp. i-ii.

Almes et al., "*Research in Integrated Distributed Computing*," Department of Computer Science, University of Washington Seattle, Oct. 1979 pp. 1-42.

Almes et al., "*The Eden System: A Technical Review*," Department of Computer Science, University of Washington Seattle, Technical Report 83-10-05, Oct. 1983, pp. 1-25.

Almes et al., "*Edmas: An Object-Oriented, Locally Distributed Mail System*," Department of Computer Science, FR-35 University of Washington Seattle, Technical Report 84-08-03, Dec. 13, 1984, pp. 1-19.

Almes et al., "*Edmas: A Locally Distributed Mail System*," Department of Computer Science, University of Washington Seattle, Technical Report 83-07-01, Jul. 7, 1983, pp. 1-17.

Auerbach et al., "*High-Level Language Support for Programming Distributed Systems*," IEEE Transactions On Software Engineering, 1992 p. 320.

Bertz, David., "*Drool Over A Little Language That Sports Multiple Inheritance*," Dr. Dobb's Journal, v18, n11, p. 74(4), Oct. 1993.

Bertz, David., *Your Own Tiny Object-Oriented Language: C++? Smalltalk? What About Bob?* (*An interpreter formed from C++ and Lisp*) Dr. Dobb's Journal, Sep., 1991, v16, n9, p. 26(8).

Bertz, David., "*Embedded Languages : Ex Talk Allows Users To Extend The Capabilities Of Your Application Programs*," BYTE Nov. 1988; p. 419-423; vol. 13, No. 12.

Black et al., "*A Language For Distributed Programming*" Department of Computer Science, University of Washington, Technical Report 86-02-03, Feb. 1986, p. 10.

Black, Andrew P., "*The Eden Programming Language*," Department of Computer Science, FR-35 University of Washington Seattle, Technical Report 85-09-01, Sep. 1985, pp. 1-19.

Black, Andrew P., "*Supporting Distributed Applications: Experience With Eden*," University of Washington Seattle, Presentation at Tenth ACM Symposium on Operating System Principles, Sep. 1985, pp. 1-14.

Black et al., "*Distribution and Abstract Types in Emerald*," Department of Computer Science, University of Washington Seattle, Technical Report 85-08-05, Aug. 1985, pp. 1-10.

Black et al., "*Distribution and Abstract Types in Emerald*," IEEE Transactions On Software Engineering, vol. SE-13 No. 1 Jan. 1987, pp. 65-76.

Black et al., "*The Eden Project: A Final Report*," Department of Computer Science, University of Washington Seattle, Technical Report 86-11-01, pp. 1-28.

Black et al., "*Distribution and Abstract Types In Emerald*," University of Washington Seattle, Technical Report 86-02-04, pp. 1-189.

Black et al., "*Object Structure in the Emerald System*," University of Washington Seattle, Technical Report 86-04-03, pp. 1-9.

Black, Andrew P., "*Supporting Distributed Applications: Experience With Eden*," Department of Computer Science, University of Washington Seattle, Technical Report 85-03-02, Mar. 1985, pp. 1-21.

Cardelli, L., "*The Amber Machine*," Proceedings Of The Thirteenth Spring School Of The LITP Proceedings, 1986, pp. 48-70.

Chambers, Craig., "*An Efficient Implementation of SELF, A Dynamically-Typed Object Oreinted Language Based On Prototypes*," Conference Proceedings, Special Issue of SIGPLAN Notices, vol. 24, No.: 10, Oct. 1989.

Chung et al., "*A "Tiny" Pascal Compiler Part 1: The P-Code Interpreter*," BYTE Publications, Sep. 1978, pp. 58-65, 148-155.

Chung et al., "*A "Tiny" Pascal Compiler Part 2: The P-Compiler*," BYTE Publications, Sep. 1978, pp. 34-52.

Duff, Charles B., "*Designing An Efficient Language*," BYTE, Aug. 1986, p. 211.

Franks, Neville., "*Adding An Extension Language To Your Software: The Little Language/Application Interface*," Dr. Dobb's Journal, Sep. 1991, v16, n9, p. 34(6).

Goldberg et al., "*Smalltalk-80 The Language and its Implementation*," Xerox Palo Alto Research Center pp. 1-707.

Gosling et al., "*The Java Language Environment A White Paper*," The Java Language Environment, Sun Microsystems, Oct. 1995, pp. 1-84.

Gosling, James., "*Java Intermediate Bytecodes*" ACM SIGPLAN Workshop On Intermediate Representations (IR '95), Jan. 1995, San Francisco, ACM SIGPLAN Notices, vol. 30, No. 3, Mar. 1995 pp. 111-118.

Gosling, James., "*System And Method For Pre-Verification Of Stack Usage In ByteCode Program Loops*," US Application Ser. No.: 08/359,882, Filed 12/20/94 pp. 1-38 Fig. 1-5.

Gosling, James., "Bytecode Program Interpreter Apparatus And Method With Pre-Verification Of Data Type Restrictions", U.S. Appl. No. 08/360,202, filed Dec. 21, 1994, pp. 1-41.

Guibas et al., "*Compilation and Delayed Evaluation In APL*," Fifth Annual ACM Symposium On Principles Of Programming Languages, Jan. 23-25, 1978, 1-8.

Guttman et al., "*The VLISP Verified Scheme System*," LISP And Symbolic Computation: An International Journal, 8, 1995, pp. 33-110.

Grimaud et al., "*FACADE: A Typed Intermediate Language Dedicated To Smart Cards*," Software Engineering Notes, Association For Computing Machinery. New York, US, vol. 24, No. 6, Sep. 6, 1999, pp. 476-493.

Holman et al., "*The Eden Shared Calender System*," Department of Computer Science, FR-35, University of Washington Seattle, Technical Report 85-05-02, Jun. 22, 1985, pp. 1-14.

Hutchison, Norman C., "*An Object Based Language for Distributed Programming*," University of Washington, Dissertation for Doctor of Philosophy, 1987, pp. 1-103.

Hsu, Felix Shamson., "*Reimplementing Remote Procedure Calls*," University of Washington, Masters Thesis, 1985, pp. 1-76.

Johnston, Robert L., "*The Dynamic Incremental Compiler of APL/3000*," Association of Computing Machinery, May 30-Jun. 1, 1979, vol. 9 No. 4-Part 1, pp. 82-87.

Jul et al., "*Fine-Grained Mobility in the Emerald System*," University of Washington, ACM Transactions On Computer Systems, vol. 6, No. 1., Feb. 1988, pp. 109-133.

Jul, Eric., "*Object Mobility in a Distributed Object Oriented System*," University of Washington, Dissertation for Doctor Of Philosophy, 1989, pp. 1-154.

Kinchin, Corinna., "*Postscript: P.S. it's a programming language, tool*" EXE, v6, n1, Jun. 1991, p. 66(5).

King, James C., "*A program Verifier*," IBM Thomas J. Watson Research Center. Yorktown Heights, New York 10598, USA.

Korfhage et al., "*Hermes Language Experiences*," Software-Practice and Experience, vol. 25(4), Apr. 1995, p. 389.

Krasner, Glen., "*Smalltalk-80 Bits of History, Words of Advice*," Xerox Palo Alto Research Center, 1983, pp. 1-343.

Lazowska et al., "*The Architecture of the Eden System*," Proceedings of the Eighth Symposium On Operating System Principles, Dec. 14-16, 1981, Asilomar Conference Grounds, Pacific Grove, California, Dec. 1981, vol. 15, No. 5.

McDaniel, Gene., "*An Analysis of a Mesa Instruction Set*," Association for Computing Machinery, Xerox Palo Alto Research Center, May 1982.

Mitchell et al., "*Mesa Language Manual*," Xerox Palo Alto Research Center, Palo Alto, California pp. 1-147.

Perrott et al., "*A Supercomputer Program Development System*," Software-Practice and Experience, Oct. 1987, vol. 17 (10), pp. 663.

Pier, Kenneth A., "*A Retrospective on the Dorado, A High-Performance Personal Computer*," Association for Computing Machinery, Xerox Palo Alto Research Center, 1983, pp. 252-269.

Pu, Calton., "*Replication and Nested Transactions in the Eden Distributed System.*," University of Washington, Department of Computer Science, Dissertation for Doctor of Philosophy, 1986, pp. 1-179.

Proudfoot, Andrew Blaine., "*Replects: Data Replication in the Eden System*," University of Washington, Department of Computer Science, Technical Report No. TR-85-12-04, pp. 1-154.

Rose et al., "*Lightweight ByteCode Verification*", Extended Abstract For FUJ'98, Sep. 21, 1998, pp. 1-23.

"*A Postscript Backgrounder*," Seybold Report On Desktop Publishing, vol. 5, No. 7, Mar. 4, 1991 p. 9(1).

Strom et al., "*NIL: An Integrated Language and System For Distributed Programming*," Association for Computing Machinery, 1983, p. 73.

Strom et al., "*Extending Typestate Checking Using Conditional Liveness Analysis*." IEEE Transactions On Software Engineering, vol. 19, No. 5, May 1993, pp. 478.

Thompson, Ken., "*Regular Expression Search Algorithm*," Communications of the ACM, vol. 11, No. 6, Jun. 1968, pp. 419-422.

Unagar et al., "*Object, Message, and Performance: How They Coexist In Self*," Computer, vol. 25 No. 10, Oct. 1, 1992, pp. 53-64.

Wright et al., "*A Practical Soft Type System for Scheme*," LISP 94, Jun. 1994, Orlando, Florida, pp. 250-262.

Yellin, Dan., "*Do Programmers Need Seat Belts?*" ACM SIGPLAN Debates (1996), pp. 5.

\* cited by examiner

MEMORY EFFICIENT PROGRAM PRE-EXECUTION VERIFIER AND METHOD

CROSS-REFERENCE TO RELATED APPLICATIONS

This application claims the benefit of and hereby incorporated by reference U.S. Provisional Application No. 60/174,975, filed Jan. 6, 2000.

FIELD OF THE INVENTION

The present invention relates generally to the use of computer software on multiple computer platforms which use distinct underlying machine instruction sets, and more specifically to a pre-execution program verifier that verifies the integrity of computer software obtained from a network server or other source.

BACKGROUND OF THE INVENTION

Referring to FIG. 1, in a networked computer system 100, a first device 102 may download a computer program 103 residing on another device 104 or 105. In this example, the first device 102 will typically be a computer controlled device, such as a conventional computer workstation, or a telephone, pager, toy or even an industrial device. The first device 102 will generally have a central processing unit 106, memory 110 for storing an operating system 112, programs, documents and other data, and a communications interface 114 for connecting to a communications network 101 such as the Internet, a local area network or a wide area network. The network 101 and interface 114 may include a wired or wireless connection to the network. Memory 110 typically includes random access memory and possibly other types of memory such as read only memory. The first device 102 may or may not include a user interface 108. The devices 102, 104 are often called "nodes on the network" or "network nodes."

The second device 104 or 105 will often be a network server, but may be a user workstation or other computer.

The purpose of the verifier of the present invention is enable the first computer to verify the integrity of a downloaded program 103, prior to execution of the program. More specifically, the verifier determines whether the downloaded program 103 will underflow or overflow its operand stack, or whether the downloaded program 103 will violate files and other resources on the user's computer.

SUMMARY OF THE INVENTION

The present invention verifies the integrity of computer programs written in "strongly data typed" computer programming languages, such as the Java language (Java is a trademark of Sun Microsystems, Inc., which is the assignee of the patent rights in the present invention). The Java language uses a restricted set of data type specific instructions, also known as bytecodes. All the available source code instructions in the language either (A) are stack data consuming instructions that have associated data type restrictions as to the types of data that can be processed by each such instructions, (B) do not utilize stack data but affect the stack by either adding data of known data type to the stack or by removing data from the stack without regard to data type, or (C) neither use stack data nor add data to the stack. The present invention is also applicable to verifiers for other strongly data typed computer programming languages.

The present invention provides a set of verifier tools and methods for identifying, prior to execution of a program, any instruction sequence that attempts to process data of the wrong type for such a instruction or if the execution of any instructions in the specified program would cause underflow or overflow of the operand stack, and to prevent the use of such a program.

More specifically, the present invention provides two verifier tools and methods: one for use by program authors, and one for use by client devices. The authoring system verifier, in addition to verifying the integrity of a program, generates a modified program having an array of supplemental information that enables the client devices to verify the modified program's integrity using less memory resources than are required by the authoring system's verifier. The supplemental information consists of data type snapshots of the program's operand stack and local variables immediately prior to execution of each of a set of identified target instructions, which are successors of conditional jump, unconditional jump, branch and flow control instructions, if any, in the program. In some embodiments, the data type snapshots for target instructions meeting predefined criteria are eliminated, or reduced in size to indicate only the instruction's location in the program, or reduced in size to include only a partial data type snapshot.

The client device verifier is fast because the instructions of the program are emulated in linear order from first to last, without regard to the order in which the instructions of the program are actually executed. The client device verifier uses the supplemental information in the program to verify the integrity of instructions which are the successors of conditional jumps, unconditional jumps, branch and flow control instructions. As a result, each instruction in the program is emulated only once by the client device.

After verification of the program by the client device's verifier, if no program faults are found, a program interpreter executes the program without performing operand stack overflow and underflow checks and without performing data type checks on operands stored in the operand stack and local variables. As a result, program execution speed is greatly improved.

BRIEF DESCRIPTION OF THE DRAWINGS

The accompanying drawings, which are incorporated in and form a part of this specification, illustrate embodiments of the invention and, together with the description, serve to explain the principles of the invention, wherein:

FIGS. 7C–7G are also representative of a portion of the program verification process used by authoring systems.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with preferred embodiments, it will be understood that they are not intended to limit the invention to those embodiments. On the contrary, the invention is intended to cover alternatives, modifications and equivalents, as defined by the appended claims.

Figure 1:
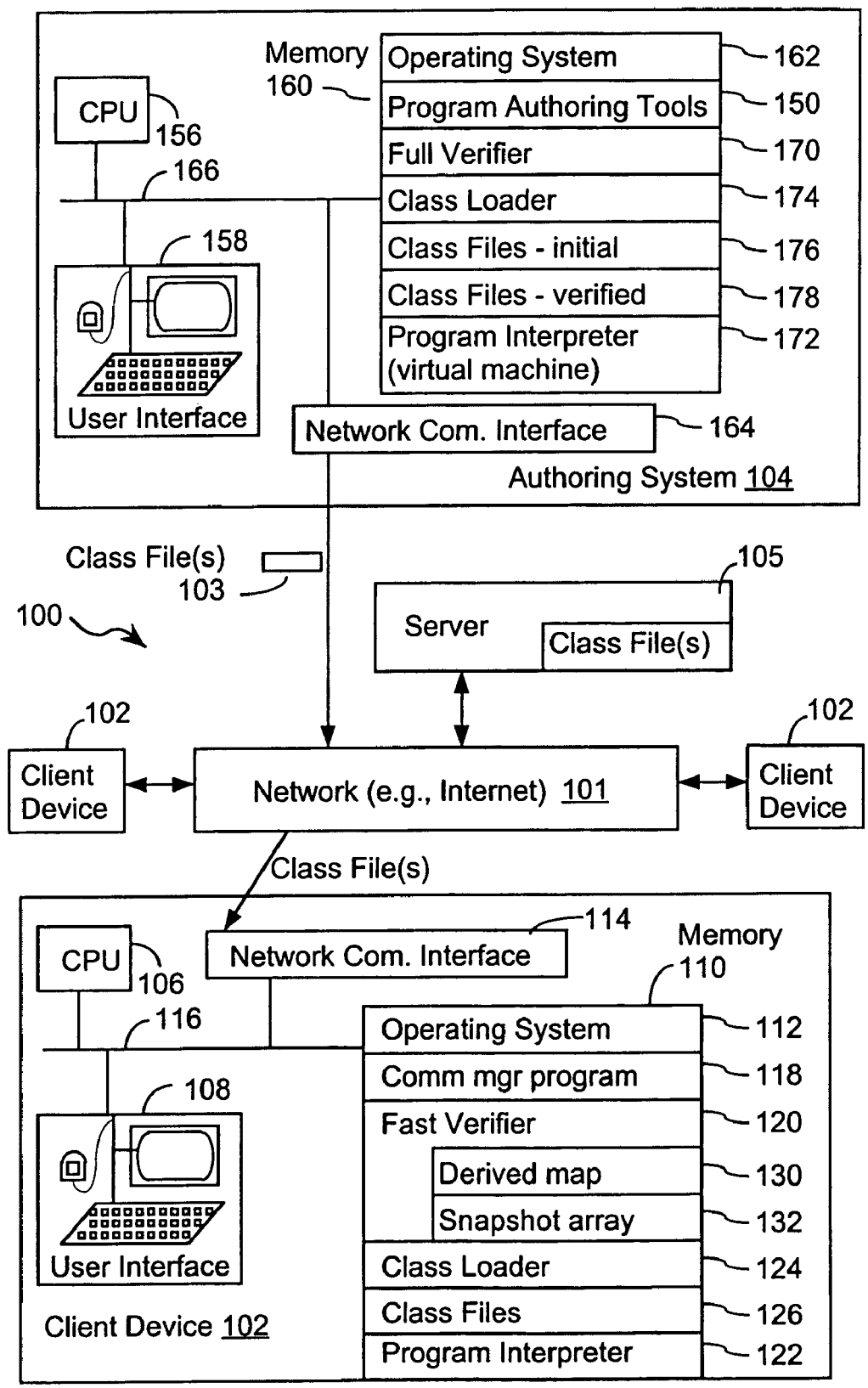
FIG. 1 is a block diagram of a computer system incorporating a preferred embodiment of the present invention.

Referring now to FIG. 1, there is shown a distributed computer system 100 having client computers 102, at least one authoring system 104, and server computers 105 (only one of which is shown). The role of the server computers 105 is to distribute files, including class files 103 (which contain programs) to client devices 102. The authoring system 104 may also be a server computer, but in many cases the authoring system 104 and server computers 105 are distinct.

In a preferred embodiment, each client computer 102 is connected to the servers 105 via the Internet 101, although other types of communication connections could be used.

The authoring system 104 and the client devices 102 may be desktop computers, such as Sun workstations, IBM compatible computers and Macintosh computers, or virtually any other type of computer. However, a client device 102 may also be a device, such as a telephone, pager, toy or even an industrial device having extremely limited memory resources compared to a typical desktop computer.

In a preferred embodiment, each client device includes a CPU 106, memory 110, a communications interface 114, and one or more internal communication busses 116 therebetween. The client device 102 may or may not include a user interface 108. Memory 110 typically stores:

- an operating system 112;
- an Internet communications manager program 118, which in some embodiments may be part of the operating system 112;
- a "fast" program verifier 120 for verifying whether or not a specified program satisfies certain predefined integrity criteria;
- a program interpreter 122 for executing application programs;
- a class loader 124, which loads class files into a user's address space and utilizes the program verifier to verify the integrity of the programs (called methods) in the class file; and
- class files 126 in use and/or available for use by client device 102.

The program verifier 120 includes or uses data structures herein called the derived map 130 and the local snapshot array 132 (which is used only in a second embodiment, discussed below) that will be described in more detail below.

In a preferred embodiment the operating system 112 is an object oriented multitasking operating system that supports multiple threads of execution within each defined address space.

The class loader 124 is typically invoked when the client device first initiates execution of a procedure, requiring that an object of the appropriate object class be generated. The class loader 124 loads in the appropriate object class and calls the program verifier 120 to verify the integrity of all the programs in the loaded object class. If all the programs are successfully verified, an object instance of the object class is generated, and the interpreter 122 is invoked to execute the requested procedure, which is typically called a method. If the procedure requested by the user is not a program of the type (e.g., Java) processed by the verifier 120, class loader 124 and interpreter 122, and if execution of that program type is allowed (which is outside the scope of the present document), the program is executed by a compiled program executer (not shown).

The class loader 124 is also invoked whenever an executing program encounters a call to an object method for an object class that has not yet been loaded into the client device. Once again the class loader 124 loads the appropriate object class file and then calls the program verifier 120 to verify the integrity of all the programs in the loaded object class. In many situations the class file will be loaded from a remotely located computer, such a server 105. If all the methods in the loaded object class are successfully verified, an object instance of the object class is generated, and the program interpreter 122 is invoked to execute the called object method.

Figures 2, 3:
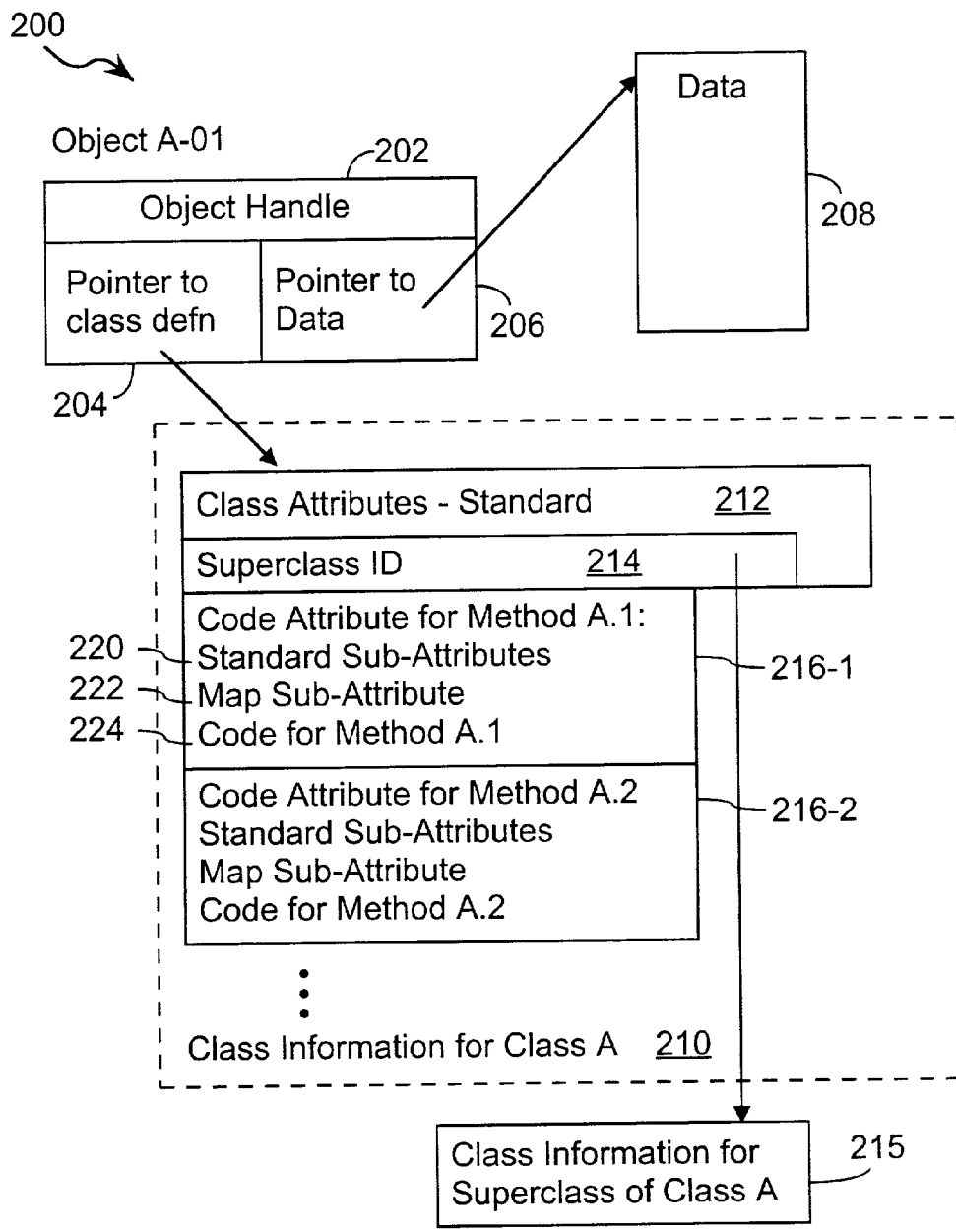
FIG. 2 is a memory map diagram for an exemplary client device.
FIG. 3 is a block diagram of the data structure for an object in a preferred embodiment of the present invention.

Referring to FIG. 2, the memory 110 of a client device 102 may, for reasons of economic efficiency, contain two or more distinct types of memory. For instance, the operating system, verifier, class loader and program interpreter, as well as certain preloaded class files may be stored in read only memory (ROM) 140, which is extremely inexpensive. Downloaded class files and data that is to be durably stored may be stored in a flash memory 142, which is more energy efficient than high speed random access memory. Finally, a small amount of high speed random access memory 144, such as static random access memory (SRAM) may be provided for storing data objects, data structures temporarily used by the program verifier, and other data structures that are less permanent than those stored in the flash memory array 142. The amount of RAM 144 provided might be as small as 0.5 to 8 kilobytes, depending on the device, the programs expected to be executed by the device, the power available to the device, and other considerations beyond the scope of this document. Therefore, for use in such client devices, the program verifier 120 must be very memory efficient.

It should be understood that the memory configuration of FIG. 2 is only one of many possible examples. For instance, in some implementations, the memory 110 might include only flash memory and high speed random access memory, in which case the flash memory might be used to store everything other than temporary objects and data structures.

Referring again to FIG. 1, the authoring system 104 is, in many ways, similar to the client devices in that it also includes a CPU 156, user interface 158, memory 160, a communications interface 164, and one or more internal communication busses 166 therebetween. Memory 160 typically stores:

- an operating system 162;
- program authoring tools 150;
- an Internet communications manager program 166, which in some embodiments may be part of the operating system 162;
- a "full" program verifier 170 for verifying whether or not a specified program satisfies certain predefined integrity criteria;
- a program interpreter 172 for executing application programs;
- a class loader 174, which loads class files into a user's address space and utilizes the program verifier to verify the integrity of the programs (called methods) in the class file; and
- class files, including "initial" class files 176 and modified class filed 178 that have been verified and modified for use by the client devices 102.

Object Class Data Structure

Data Types of Data Typed Instructions

FIG. 3 shows the data structure 200 in a preferred embodiment of the present invention for an object A-01 of class A. An object of object class A has an object handle 202 that includes a pointer 204 to the methods and other class information 210 for object's object class, and a pointer 206 to a data array 208 for the object. The pointer 204 to the object's class information may be an indirect pointer.

The class information 210 for an object class includes "standard" class attributes 212, which are attributes not specific to this invention, including a superclass identifier 214—which points to the class information 215 for the class that is the superclass of the current class. The class information also includes a code attribute 216 for each program, called a method, of the class. The code attribute includes various sub-attributes, including (A) "standard" sub-attributes 220 (e.g., attributes that define the parameters passed to the method via local variables, information about length of the code attribute, information about exception handlers, if any, that are included in the method, and so on); (B) the map sub-attribute 222, which is a new sub-attribute utilized by the present invention, and (C) the code attribute 224 which contains the code or instructions that comprise the method.

The Java instruction set is characterized by bytecode instructions that are data type specific. Specifically, the Java instruction set distinguishes the same basic operation on different primitive data types by designating separate opcodes. Accordingly, a plurality of bytecodes are included within the instruction set to perform the same basic function (for example to add two numbers), with each such bytecode being used to process only data of a corresponding distinct data type. In addition, the Java instruction set is notable for instructions not included. For instance, there are no instructions in the Java bytecode language for converting numbers into object references. These restrictions on the Java bytecode instruction set help to ensure that any program which utilizes data in a manner consistent with the data type specific instructions in the Java instruction set will not violate the integrity of a user's computer system.

In a preferred embodiment, the available data types are integer, long integer, single precision floating point, double precision floating point, and handles (sometimes herein called object instances or object references). Additional data types are arrays of integers, arrays of long integers, arrays of single precision floating point numbers, arrays of double precision floating point numbers, arrays of handles, arrays of booleans, arrays of bytes (8-bit integers), arrays of short integers (16 bit signed integer), and arrays of unicode characters.

The "object instance" data type, also called the "handle" data type, includes a virtually unlimited number of data subtypes because there is a distinct object instance subtype for each different object class and there is virtually no limit on the number of object classes that can be defined.

In addition, constants used in programs are also data typed, with the available constant data types comprising the data types mentioned above, plus class, fieldref, methodref, string, and Asciz, all of which represent two or more bytes having a specific purpose.

The few Java language instructions that are data type independent perform operand stack manipulation functions such as (A) duplicating one or more words on the stack and placing them at specific locations within the stack, thereby producing more stack items of known data type, or (B) clearing one or more items from the stack. A few other data type independent instructions do not utilize any words on the stack (nor in any local variables) and leave the stack and local variables unchanged, or add words to the stack without utilizing any of the words previously on the stack. These instructions do not have any data type restrictions with regard to the stack and local variable contents prior to their execution, and all but a few modify the content of the stack or local variables and thus affect the program verification process.

The authoring, client and server devices 102, 104 and 105 may utilize different computer platforms and operating systems, in which case object code programs executed on one will not be executable on the others, because object code programs are generally platform specific. For instance, the server node 105 might be a Sun Microsystems computer using a Solaris (trademark of Sun Microsystems, Inc.) operating system while the authoring system 104 may be an IBM compatible computer using a Pentium III (trademark of Intel) microprocessor and a Windows (trademark of Microsoft) operating system, and the client device may be a telephone that uses a device specific micro operating system designed for use by embedded devices. Furthermore, other client devices coupled to the same network and utilizing the same server 105 might use a variety of different computer platforms and a variety of operating systems.

Prior to the introduction of the Java language, a server 105 used for distributing software on a network having computers or devices of many types would store distinct libraries of software for each of the distinct computer platform types (e.g., Unix, Windows, DOS, Macintosh, etc.). Thus, different versions of the same computer program might be stored in each of the libraries. However, using Java language programs, many computer programs are distributed by such a server using just a single version of the program.

The program verifier 120 is a program, executed by client devices, which verifies operand data type compatibility and proper stack manipulations in a specified program prior to the execution of the program by the processor 106 under the control of the program interpreter 122. Each program has an associated verification status value that is True if the program's integrity is verified by the verifier 120, and it otherwise set to False.

During normal execution of programs using languages other than the Java language, the interpreter must continually monitor the operand stack for overflows (i.e., adding more data to the stack than the stack can store) and underflows (i.e., attempting to pop data off the stack when the stack is empty). Such stack monitoring must normally be performed for all instructions that change the stack's status (which includes most all instructions). For many programs, stack monitoring instructions executed by the interpreter account for approximately 80% of the execution time of an interpreted computed program.

For many purposes, particularly the integrity of downloaded computer programs, the Internet is a "hostile environment." A downloaded program may contain errors involving the data types of operands not matching the data type restrictions of the instructions using those operands, which may cause the program to be fail during execution. Even worse, a program might attempt to create object references (e.g., by loading a computed number into the operand stack and then attempting to use the computed number as an object handle) and to thereby breach the security and/or integrity of the client device.

The fast verifier 120 of present invention enables verification of a program's integrity, even when the client device has extremely limited memory resources, and allows the use of a program interpreter 122 that execute the usual stack monitoring instructions during program execution, thereby greatly accelerating the program interpretation process.

The Program Verifier

While the execution of a program results in data values being temporarily stored in an operand stack and in local variables, the program verifier 120 emulates execution of the program without computing specific data values. Instead, it maintains a virtual stack 274 and a set of virtual registers 278 (FIG. 4), and stores data type values in them so as to keep track of the data type of each value that would be stored by the program in the corresponding operand stack entries and corresponding local variables. The set of data types derived by the verifier for the stack and local variables is herein called a "derived map" 130 (FIG. 1) of data types. When a copy of the derived map is saved for later use, it is called a "snapshot".

Figure 4:
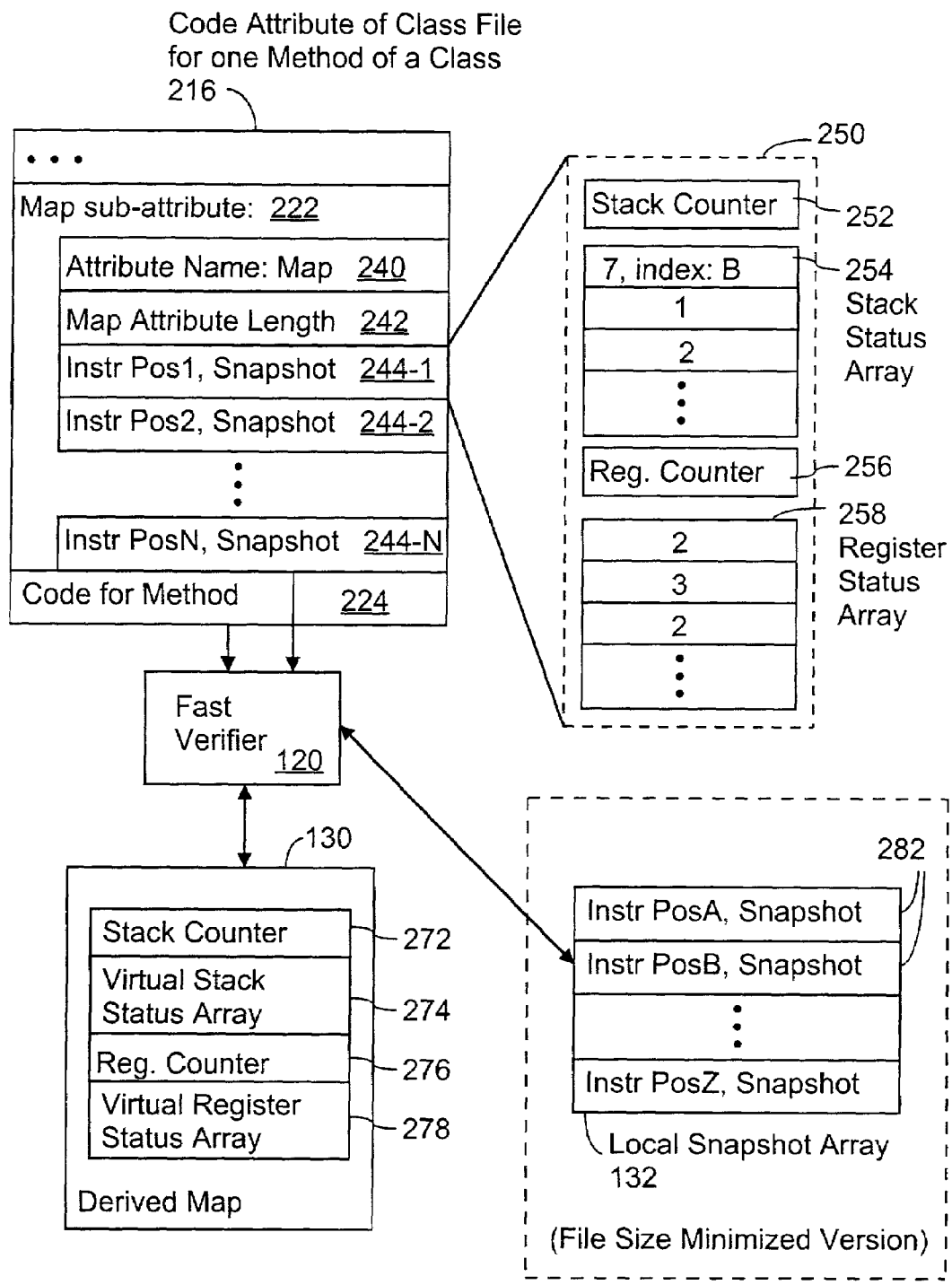
FIG. 4 is a block diagram of the data structures maintained by a client device's program verifier during verification of a program in accordance with the present invention.

Referring now to FIG. 4, the program verifier 120 (often called the "verifier") uses a few temporary data structures to store information it needs while verifying a specified program, as represented by the code attribute 216 for that program, as well as information in the map sub-attribute 222 of the program. The map sub-attribute 222 for each program is a data structure that includes:

an attribute name 240, which identifies this attribute as a map attribute; this is generally implemented as a pointer to an item in a constant pool, where the item in the constant pool is the string "map";

a length value 242, indicating the length of the map attribute; and a set of snapshots 244, each of which include a code offset value, indicating the position of the instruction corresponding to the snapshot, and a snapshot array 250.

Because "local variables" used by Java programs are accessed using instructions similar to the register access instructions used in other programming languages, we use the term "registers" to mean the storage locations for local variables.

Each snapshot array 250 includes:

a stack count value 252, which indicates the number of stack data type values 254 that immediately follow the count 252;

an array of data type values 254, the number of entries being specified by the stack count value 252;

a register count value 256, which indicates the number of local variables stored in registers and whose data type values immediately follow the count 256; and an array of register data type values 258, the number of entries being specified by the register count value 256.

The data structure definition for the map sub-attribute may be written as follows:

```
Map_attribute {
    u2 attribute_name_index;
    u4 attribute_length;
    u2 number_of_entries;        // number of snapshots //
    { u2 byte_code_offset;       // offset position //
      u2 number_of_locals;       // local variable data type info //
      uT types_of_locals[number_of_locals];
      u2 number_of_stack_items   // stack entry data type info //
      uT types_of_stack_items[number_of_stack_items];
    } entries [number_of_entries];
}
``` where u2 represents two byte values, u4 represents four byte values, and uT represents either a one byte or three byte value, as explained in more detail below.

In a preferred embodiment, the data type value for each stack entry and each local variable entry is encoded in each snapshot data structure as an integer value between 0 and 8, as follows:

| Data type | Data type code | Description |
|---|---|---|
| Bogus | 0 | an unknown or uninitialized value |
| Integer | 1 | a 32-bit integer |
| Float | 2 | a 32-bit floating point number |
| Double | 3 | a 64-bit floating point number |
| Long | 4 | a 64-bit integer |
| Null | 5 | result of the aconst_null instruction |
| InitObject | 6 | Before a constructor (the <init> method) for a class other than java.lang.object calls a constructor of one of its superclasses, the "this" pointer has a data type of InitObject. |
| Object | 7 | A class instance. The one-byte type code (7) is followed by a two-byte index into the constant pool table to the entry that contains the name of an object class. |
| NewObject | 8 | An uninitialized class instance. The class instance has just been created by the "new" instruction, but a constructor (the <init> method) has not yet been invoked on it. The type code 8 is followed by a two-byte index into the constant pool table to an entry that identifies the instruction that created the object instance. (The uninitialized object is created by the "new" instruction. The verifier uses this type to enforce that an object instance cannot be used until it is fully constructed.) |

Stack and register entries whose data type value is between 0 and 6 are encoded using one byte, while entries whose data type value is 7 or 8 are encoded using three bytes.

During execution of the program verifier 120 used in the client devices, the verifier maintains a "derived map" 130 (also called the derived data types array), which is a current data type snapshot of the stack and local variables used by the program. That is, as the verifier processes each instruction of the program, it updates the derived map 130 to represent the number 272 of entries in the operand stack, the data types of the stack entries 274, the number 276 of local variables defined at that point in the program, and their data types 278. Generally, the number 276 of local variables is set to a fixed number specified in the code attribute of the method, equal to the maximum number of local variables used by the method's definition, and the data types 278 of the corresponding virtual registers are initially set to "bogus" until the verifier processes instructions that write data into them.

In a second embodiment of the verifier 120, the verifier saves "snapshots" 282 of the derived map 130 for certain instructions in a local snapshot array 132. In particular, the snapshots 282 are saved in local memory for certain "target instructions" that are the targets jump, branch and flow control instructions but for which a snapshot is not found in the map sub- attribute 222 of the program. This will be explained in more detail below. The local snapshot array 132 is not used in the first preferred embodiment of the fast verifier 120.

While processing the specified program, for each datum that would be popped off the operand stack for processing by an instruction, the verifier pops off the same number of data type values off the virtual stack 274 and compares the data type values with the data type requirements of the instruction. For each datum that would be pushed onto the operand stack by an instruction, the verifier pushes onto the virtual stack 274 a corresponding data type value.

One aspect of program verification is verification that the number of the operands in the virtual stack 274 is identical every time a particular instruction is executed, and that the data types of operands in the virtual stack are compatible with the data type restrictions for the instructions that utilize the operands in the stack. If a particular instruction can be immediately preceded in execution by two or more different instructions, then the status of the virtual stack immediately after processing of each of those different predecessor instructions must be compared. Usually, at least one of the different preceding instructions will be a conditional or unconditional jump or branch instruction. A corollary of the above "stack consistency" requirement is that each program loop must not result in a net addition or reduction in the number of operands stored in the operand stack.

The snapshots 244 stored by the authoring system in a program's map sub-attribute 222 are used to indicate the values that should be in the virtual stack 274 and virtual registers 278 of the verifier when the verifier reaches certain instructions in the program. Unlike the verifier described in U.S. Pat. No. 5,740,441 (Yellin et al.), the fast verifier 120 does not store a snapshot for every instruction in the program. Rather, a small number of snapshots are precomputed by the authoring system and stored in the program itself. The fast verifier only maintains the derived map 130, which is the equivalent of one snapshot. As a result, the amount of memory needed by the verifier 120 for storing temporary data structures is much, much less than for the verifier of U.S. Pat. No. 5,740,441.

Authoring System Verification of Program

Figure 5:
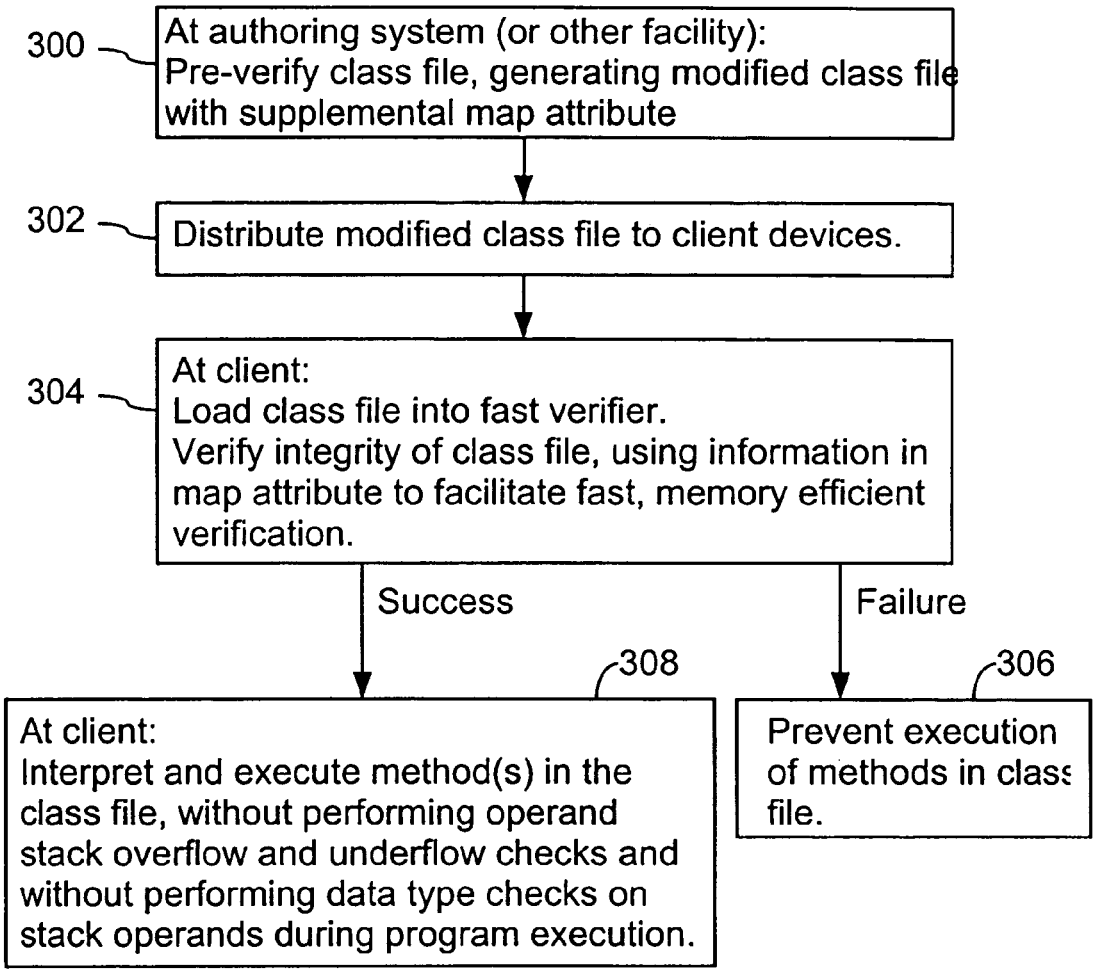
FIG. 5 is a top level flow chart of a process for pre-verifying a program at an authoring system and generating a modified program with supplemental information, distributing the program to client devices, and then verifying the program's integrity at the client devices prior to execution at the client devices.

Referring to FIGS. 1 and 5, it is the job of the Authoring system to facilitate program verification by storing a small number of virtual stack and register snapshots in the program. It has been found that this increases the size of a typical class file by about five percent. The density of jump, branch and flow control statements in each program determines the number of snapshots needed. In a second preferred embodiment discussed below, the overhead for snapshots is reduced to an average of about one percent, but the client device's working memory requirements are increased from virtually nil to about four percent of the size of the largest method in the class file whose methods are being verified.

Referring to FIG. 5, the authoring system, or a facility that generates modified class files on behalf of the authoring system, pre-verifies a class file, preferably using a "full verifier" such as the one described in U.S. Pat. No. 5,740, 441 (Yellin et al.), which is hereby incorporated by reference as background information. In addition, if the program is successfully verified, meaning that it satisfies all the data type and stack usage restrictions of the language in which the program is encoded, then a modified class file is generated by the authoring (or other) system with a supplemental map sub-attribute added to the code attribute for each method of the class file (300). The modified class file is then distributed to client devices (302), or put on a server 105 where it is made available for downloading by client devices on an as-needed basis.

At each client device, the class file is loaded into the fast verifier, which then attempts to verify the integrity of the class file. By using the information in the map sub-attribute of each method, the verification of the program is made memory efficient and fast.

The class loader 124 of the client device is typically invoked when the device (or a user of the client device) first initiates execution of a procedure, requiring that an object of the appropriate object class be generated. The class loader 124 loads in the appropriate object class file and calls the program verifier 120 to verify the integrity of all programs in the loaded object class. If the verifier returns a "verification failure" value, the attempt to execute the specified program is aborted by the class loader.

If all the methods are successfully verified, an object instance of the object class is generated, and the program interpreter 122 is invoked to execute the user requested procedure (308), which is typically called a method. The program interpreter of the present invention perform (and need to perform) any operand stack overflow and underflow checking during program execution and also perform any data type checking for data stored in the operand stack during program execution. These conventional stack overflow, underflow and data type checking operations can be skipped by the present invention because the verifier has already verified that errors of these types will not be encountered during program execution.

If the verification fails, execution of the programs in the class file is prevented (306).

Figure 6:
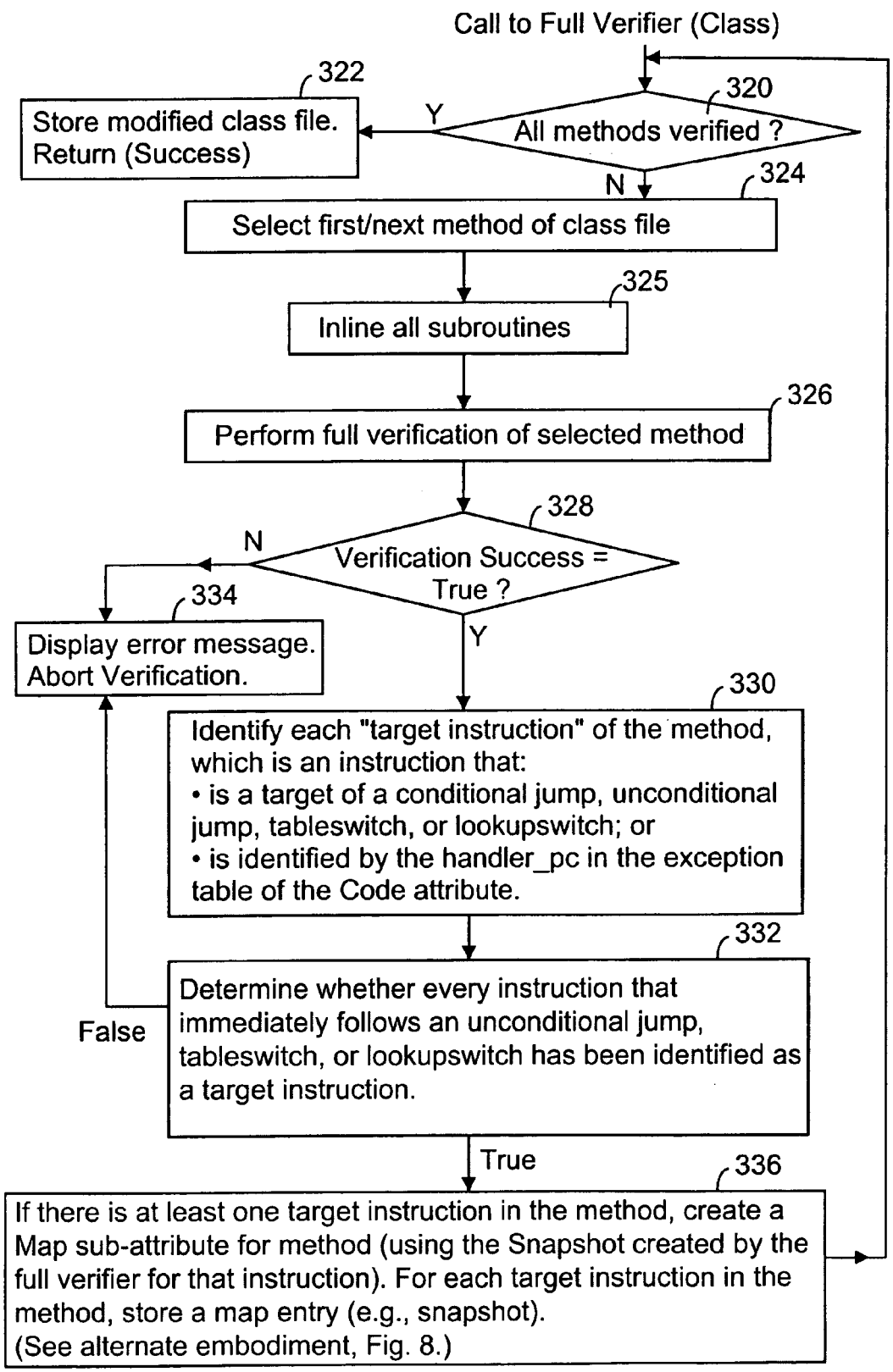
FIG. 6 is a flow chart of a program verification process used in an authoring system.

Referring to FIG. 6, the operation of the full verifier is described in more detail. The full verifier processes each method of the class, one at a time (324), until all the methods have been verified (320), and which point it stores the modified class file (generated during the verification process) and returns a success indicator (322). For each method (324), all subroutines all "inlined," which means that the subroutines are converted into inline code (325). The inlining of subroutines simplifies the verification procedure to be performed by the client devices. After inlining subroutines, if any, a normal, full verification of the method is performed 326.

The fast verifier, described below, requires that all subroutines in the methods of class file be inlined before it is processed by the fast verifier. Such class files do not contain "jsr" and "ret" instructions. It has been observed that inlining subroutines does not lead to a noticeable increase in class file size. See Stephen N. Freund, "The Costs and Benefits of Java Bytecode Subroutines," Formal Underpinnings of Java Workshop at OOPSLA'98, October, 1998.

The following is an example of inlining a subroutine in a method. In this example, the source code contains a try-finally statement:

```
void tryFinally( ) {
    try {
        tryItOut( );
    } finally {
        wrapItUp( );
    }
}
```

Using the above source code as its input, the javac compiler generates the following code:
Method void tryFinally( )
0 aload_0
1 invokevirtual tryItOut( )
4 jsr 14
7 return
8 astore_1
9 jsr 14
12 aload_1
13 athrow
14 astore_2
15 aload_0
16 invokevirtual wrapItUp( )
19 ret 2

Exception table:

| From | To | Target | Exception |
|------|-----|--------|-----------|
| 0    | 4   | 8      | any       |

Instructions from offset 14 to 19 constitute a subroutine. The subroutine is called from two places: one (the first "jsr" instruction at offset 4) in the normal control flow, another (the second "jsr" instruction at offset 9) when an exception occurs.

The following is the result of inlining the two subroutine calls:
Method void tryFinally( )
0 aload_0
1 invokevirtual tryItOut( )
4 aload_0
invokevirtual wrapItUp( )
8 return
9 astore_1
10 aload_0
11 invokevirtual wrapItUp( )
14 aload_1
15 athrow Exception table:

| From | To | Target | Exception |
|------|-----|--------|-----------|
| 0    | 4   | 9      | any       |

Interestingly, although the inlined procedure has two calls to wrapItUp instead of one, the code duplication caused by subroutine inlining actually makes the overall method size smaller. In practice, inlining subroutines does not noticeably increase class file size, because most subroutines are small, and deeply nested subroutines are rare. As the above example demonstrates, inlining eliminates the header and tail portions of subroutines and can thus make the overall size smaller. Also, while subroutines are designed to handle the potential exponential code size explosion from compiling deeply nested try-finally blocks, in practice few programs contain deeply nested try-finally blocks.

While developing this invention, the class file size change caused by inlining subroutines was measured for a set of examples, as follows:

|              | original size | jsr inlined | size change |
|--------------|---------------|-------------|-------------|
| JDK 1.1.8 classes | 7595149   | 7603304     | +0.1%       |
| KVM classes  | 89549         | 89610       | +0.07%      |
| KVM samples  | 56608         | 56591       | −0.03%      |

This result is consistent with Freund's measurements: class file size change caused by inlining subroutines is insignificant.

While portions of the extra steps 330, 332, 336 described below can be performed during verification, for clarity they are described separately. If the verification is successful, indicated by the VerificationSuccess flag being equal to True (328), the verification procedure identifies all the "target instructions" of the method (330). In the Java language, target instructions are defined to be the successor or successors (sometimes called the target) of a conditional jump, unconditional jump, tableswitch or lookupswitch instruction, as well as the entry point instruction of each exception handler in the method, which is identified by the handler_pc in the exception table of the Code attribute. Target instructions preferably do not include successor instructions positioned immediately after a conditional branch instruction, because the derived map of those successor instructions can be derived from emulation of the predecessor instruction.

The verifier also preferably looks for "dead code" in the method (332). Dead code is code that is never executed because there is no way for the program to reach those instructions. Dead code is not a true error, in that it will not cause a data type or stack usage violation, but dead code does cause difficulties for the fast verifier, and therefore if dead code is detected, the full verification procedure aborts. Dead code is identified by checking whether every instruction that immediately follows an unconditional jump, tableswitch or lookupswitch instruction has been identified as a target instruction. If not, the program contains dead code. In an alternate embodiment, dead code is explicitly identified in the map sub-attribute, so that the fast verifier can skip over it. In another alternate embodiment, the first instruction of each block of dead code is added to the list of target instructions, and a virtual stack and local variable snapshot is computed each such instruction during step 336.

If no dead code is found (332), or step 336 is adapted to compute snapshots for the first instruction of each block of dead code, and there is at least one target instruction in the method, then a map sub-attribute is created for the method. The map sub-attribute is populated with the virtual stack and local variable snapshots created by the full verifier during the verification process (see, for example, the description of the "full verifier" in U.S. Pat. No. 5,740,441, Yellin et al.). That is, for each target instruction, a snapshot entry is stored in the map sub-attribute. Each snapshot entry specifies the state of the virtual stack and local variables immediately before execution of a respective target instruction.

The identification of target instructions, and the storage of snapshots for those instructions is preferably performed during the method verification (step 326). The creation of the map sub-attribute is performed at the end, if verification is successful. If a method includes no conditional jump, unconditional jump, tableswitch and lookupswitch instructions and also does not include any exception handlers, then there will be no target instructions. For such methods, no map sub-attribute is needed. In an alternate embodiment, a map sub-attribute is generated even for such methods, but the map sub-attribute will simply indicate that it contains no entries. Such a map sub-attribute is potentially useful because it would enable the fast verifier of the client devices to determine that the class file has been pre-processed so as to enable fast verification, even before it attempts to verify the methods in the class file.

After all the methods of the class have been processed, a modified class file with the map sub-attributes added is generated (322).

When a snapshot to be included in the map sub-attribute is created from the derived map, the virtual registers are inspected to determine the highest virtual register than contains a data type value other than bogus. The snapshot includes only the virtual registers up to that highest register with a non-bogus data type, and the register counter 256 (FIG. 4) in the snapshot 244 is set accordingly.

Fast Verification Procedure for Client Devices

Referring now to FIGS. 7A–7F, the execution of the fast verifier program 120 will be described in detail.

The fast verifier 120 does not assume that the full verifier of the authoring system was used to verify the integrity of any class file, or that the class file contains map sub-attributes for its methods. While these conditions are almost always necessary for the fast verifier to verify the integrity of the methods in a class file (except for class files containing only extremely simple methods), if a class file has not been properly pre-processed, then the fast verifier will simply reject it. It is important to realize that this is not a bad result. Class files that cannot be verified and executed within the memory constraints of the client device are, in fact, defective from the viewpoint of the client device.

Similarly, the fast verifier does not rely on any map sub-attribute to be authentic. The right thing happens even when the map sub-attribute has been tampered or corrupted: verification fails and the class file is rejected. The only exception is where the modified map sub-attribute indicates a supertype of the data type that would normally be derived by the verifier. Specifying a supertype in a map sub-attribute is not an error, and does not cause verification to fail.

Figure 7A:
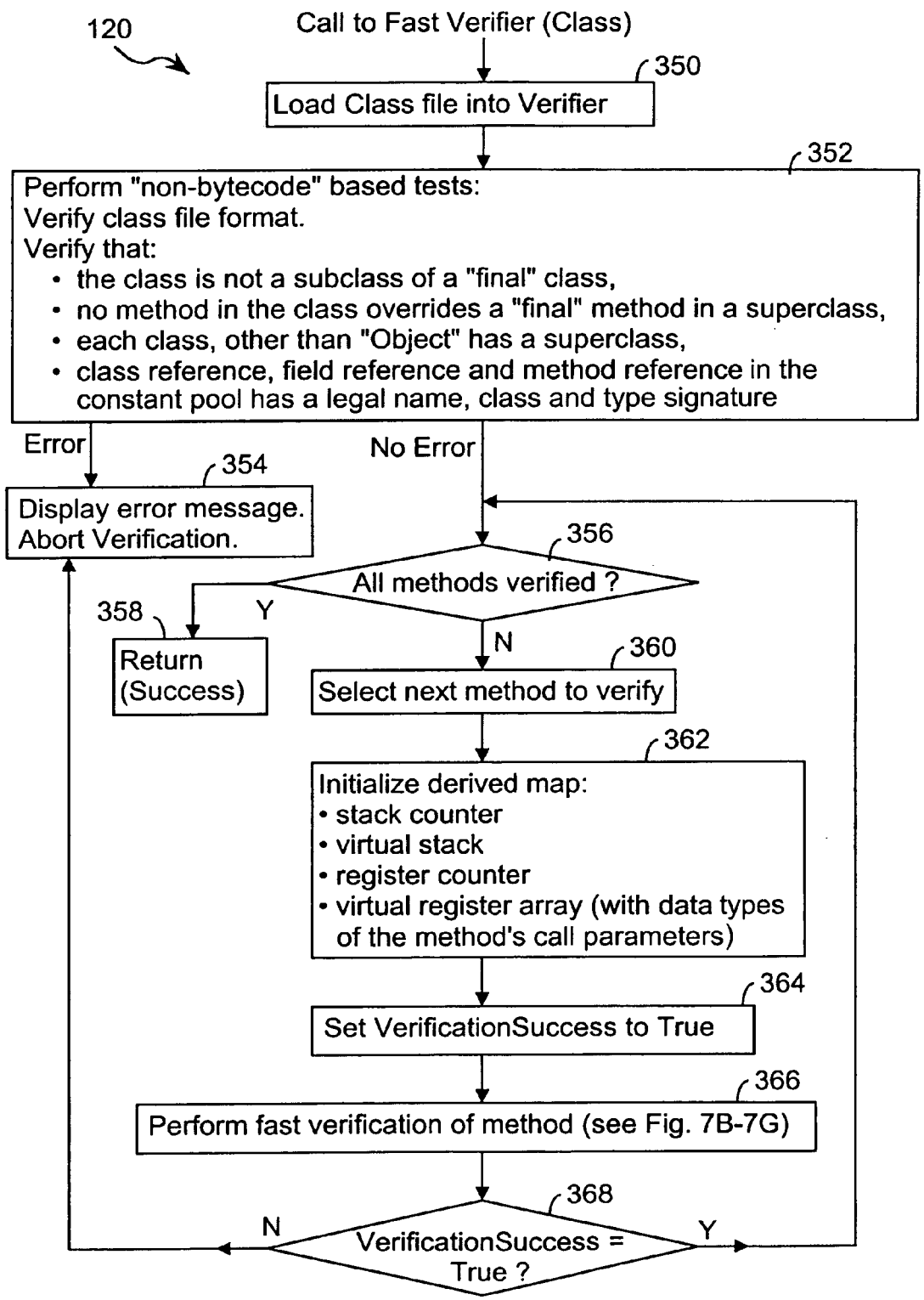
FIGS. 7A–7G are flow charts of the memory efficient program verification process used by client devices in a preferred embodiment of the present invention.

As shown in FIG. 7A, a selected class file containing one or more methods is loaded (350) into the verifier 120 for processing. The verifier first performs a number of "non-bytecode" based tests (352) on the loaded class, including verifying:
  the class file's format;
  that the class is not a subclass of a "final" class;
  that no method in the class overrides a "final" method in a superclass;
  that each class, other than "Object," has a superclass; and
  that each class reference, field reference and method reference in the constant pool has a legal name, class and type signature If any of these initial verification tests fail, an appropriate error message may be displayed or printed (if the client device has an appropriate user interface), and the verification procedure exits with an abort return code (354).

Next, the verification procedure checks to see if all methods have been verified (356). If so, the procedure exits with a success return code (358). Otherwise, it selects a next method in the loaded object class file that requires verification (360).

The code for each method includes the following information:
  the maximum stack space needed by the method;
  the maximum number of registers used by the method;
  the method's type signature, which indicates the initial contents of the registers;
  the actual instructions for executing the method;
  a table of exception handlers.

Each entry in the exception handlers tables gives a start and end offset into the program code, an exception type, and the offset of a handler for the exception. The entry indicates that if an exception of the indicated type occurs within the code indicated by the starting and ending offsets, a handler for the exception will be found at the given handler offset.

After selecting a method to verify, the verifier initializes a number of data structures (362), including the stack counter 272, virtual stack 274, local variable/register counter 276 and virtual register array 278. The virtual stack and register array are initialized to indicate that the stack is empty and the registers are empty (i.e., contain "bogus" values) except for data types indicated by the method's type signature, which indicates the initial contents of the registers.

A flag called VerificationSuccess is set to True (364). If the VerificationSuccess flag is still set to True when the verification procedure is finished (368), that indicates that the integrity of the method has been verified. If the VerificationSuccess flag is set to False when the verification procedure is finished, the method's integrity has not been verified, and therefore an error message is displayed or printed, and the verification procedure exits with an abort return code (354).

After these initial steps, the instructions of the program are emulated, one at a time, starting with the first instruction and proceeding in strict code position order (366), without regard to the actual flow of execution of the program until the last instruction is emulated. Each instruction is emulated once and only once. The details of the program analysis, which forms the main part of the verification procedure, is discussed below with reference to FIG. 7B.

In summary, the verification procedure processes each method of the loaded class file until either all the methods are successfully verified, or the verification of any one of the methods fails.

Analysis of a Selected Method

Figure 7B:
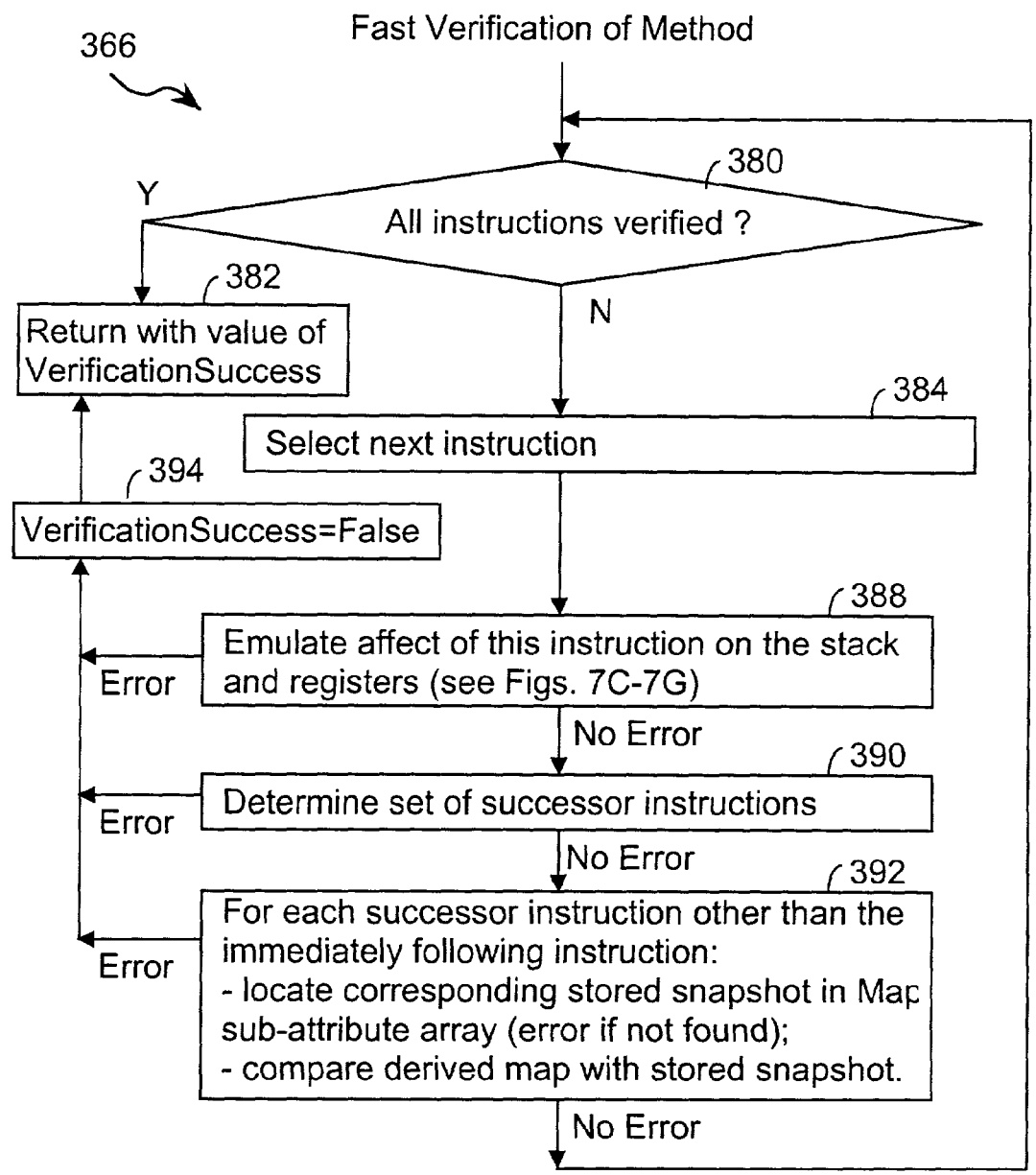

Referring to FIG. 7B the verification of a selected method is completed (382) when the last instruction of the program has been verified (380). Detection of any stack or register usage error during the analysis causes the VerificationSuccess flag to be set to False and for the analysis to be stopped (382).

If there is at least one instruction not yet verified (380), the procedure selects a next instruction (384), progressing in linear order through the method.

The analysis of the selected instruction begins with emulating the effect of the instruction on the virtual stack and registers (388). More particularly, four types of "actions" performed by instructions are emulated and checked for integrity: stack pops, stack pushes, reading data from registers and writing data to registers. The detailed steps of this emulation process are described next with reference to FIGS. 7C–7G.

Emulation of Selected Instruction

Figure 7C:
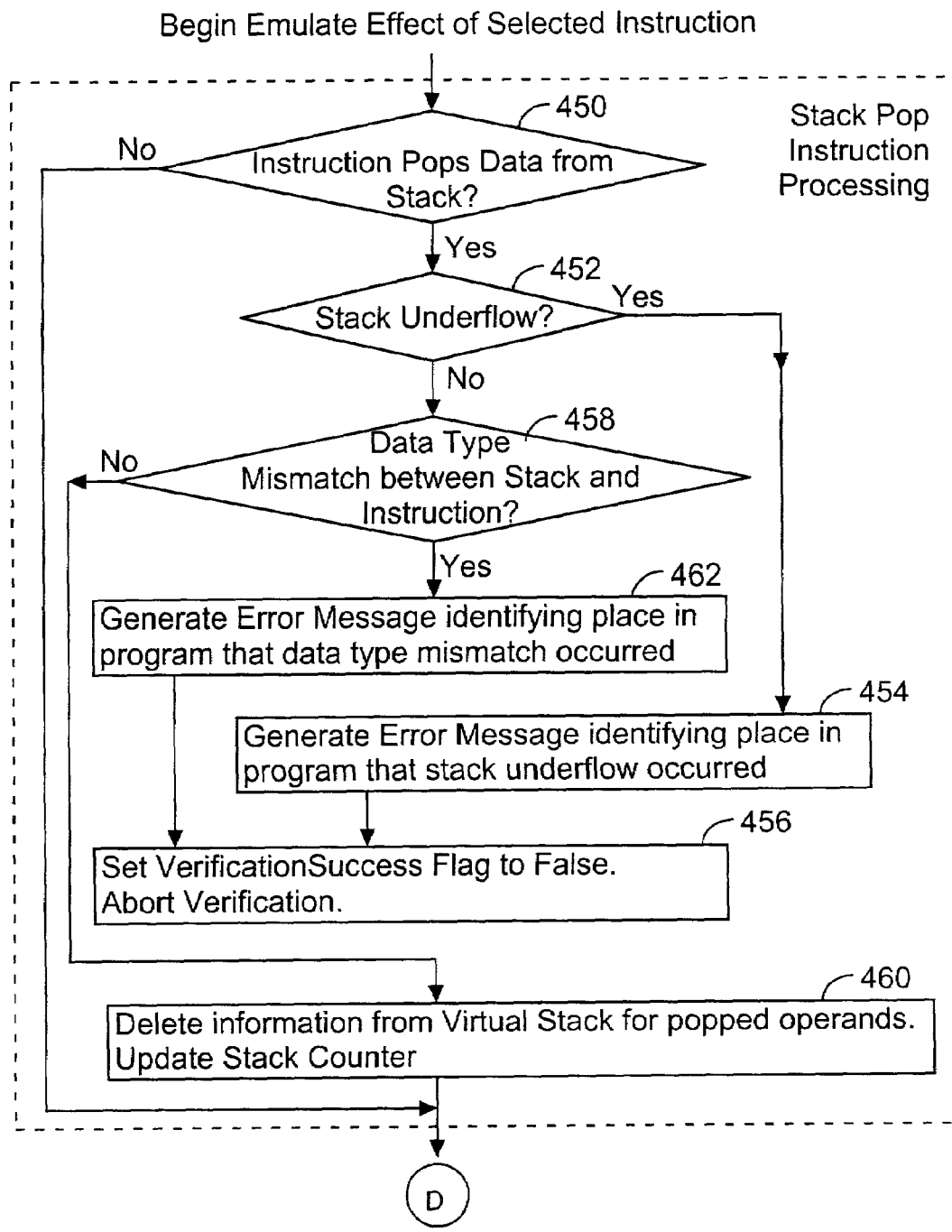

Referring to FIG. 7C, if the selected instruction pops data from the stack (450), the stack counter 272 is inspected (452) to determine whether there is sufficient data in the stack to satisfy the data pop requirements of the instruction. If the operand stack has insufficient data (452) for the current instruction, that is called a stack underflow, in which case an error signal or message is generated (454) identifying the place in the program that the stack underflow was detected. In addition, the verifier will then set a VerificationSuccess flag to False and abort (456) the verification process.

If no stack underflow condition is detected, the verifier will compare (458) the data type code information previously stored in the virtual stack 274 (i.e., in the derived map 130, FIG. 4) with the data type requirements (if any) of the currently selected instruction. For example, if the opcode of the instruction being analyzed calls for an integer add of a value popped from the stack, the verifier will compare the operand information of the item in the virtual stack which is being popped to make sure that is of the proper data type, namely integer. If the comparison results in a match, then the verifier deletes (460) the information from the virtual stack associated with the entry being popped and updates the stack counter 272 to reflect the number of entries popped from the virtual stack 274.

If a mismatch is detected (458) between the stored operand information in the popped entry of the virtual stack 274 and the data type requirements of the currently selected instruction, then a message is generated (462) identifying the place in the program where the mismatch occurred. The verifier will then set the VerificationSuccess flag to False and abort (456) the verification process. This completes the stack pop verification process.

Figure 7D:
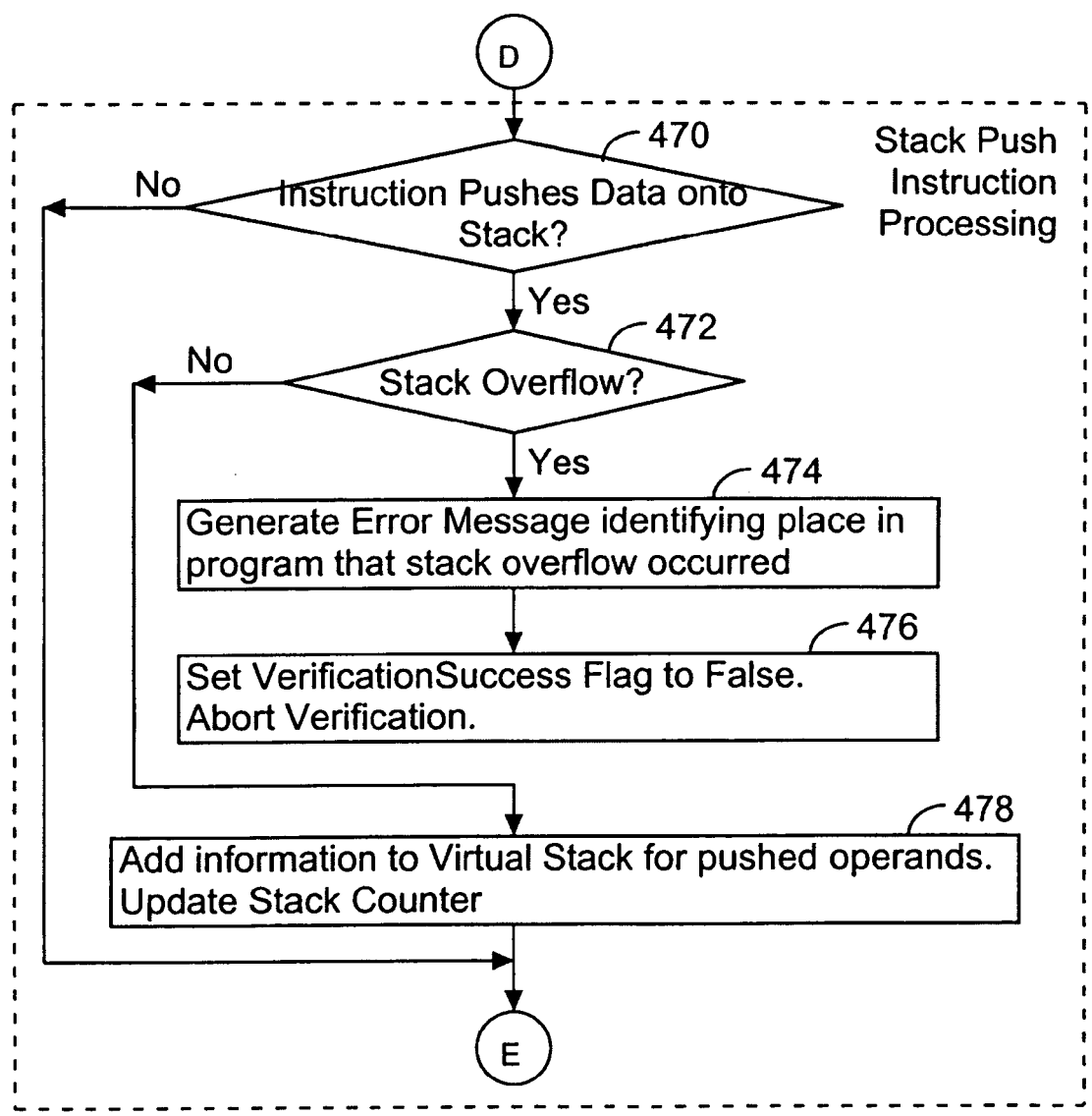

Referring to FIG. 7D, if the currently selected instruction pushes data onto the stack (470), the stack counter is inspected (472) to determine whether there is sufficient room in the stack to store the data the selected instruction will push onto the stack. If the operand stack has insufficient room to store the data to be pushed onto the stack by the current instruction (472), that is called a stack overflow, in which case an error signal or message is generated (474) identifying the place in the program that the stack overflow was detected. In addition, the verifier will then set the VerificationSuccess flag to False and abort (476) the verification process.

If no stack overflow condition is detected, the verifier will add (478) an entry to the virtual stack indicating the type of data (operand) which is to be pushed onto the operand stack (during the actual execution of the program) for each datum to be pushed onto the stack by the currently selected instruction. This information is derived from the data type specific opcodes (instructions) utilized in the program, the prior contents of the stack and the prior contents of the registers. The verifier also updates the stack counter 272 (FIG. 4) to reflect the added entry or entries in the virtual stack 274. This completes the stack push verification process.

Figure 7E:
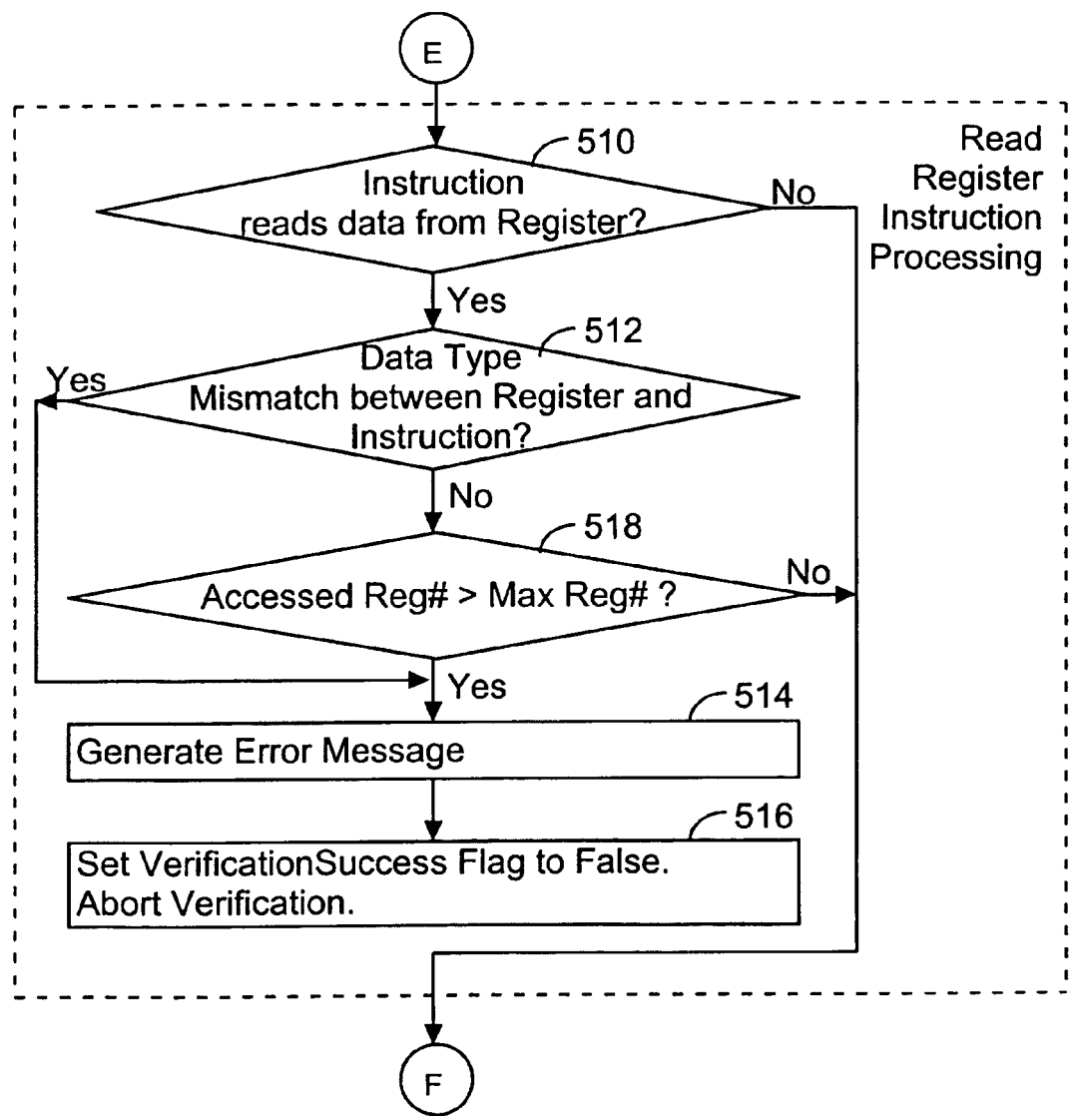

Referring to FIG. 7E, if the currently selected instruction reads data from a register (510), the verifier will compare (512) the data type code information previously stored in the corresponding virtual register with the data type requirements (if any) of the currently selected instruction. For object handles, data type checking takes into account object class inheritance (i.e., a method that operates on an object of a specified class will can also operate on an object of any subclass of the specified class). If a mismatch is detected (512) between the data type information stored in the virtual register and the data type requirements of the currently selected instruction, then a message is generated (514) identifying the place in the program where the mismatch occurred. The verifier will then set the VerificationSuccess flag to False and abort (516) the verification process.

The verifier also checks to see if the register accessed by the currently selected instruction has a register number higher than the maximum register number for the method being verified (518). If so, a message is generated (514) identifying the place in the program where the register access error occurred. The verifier will then set the VerificationSuccess flag to False and abort (516) the verification process.

Figure 7F:
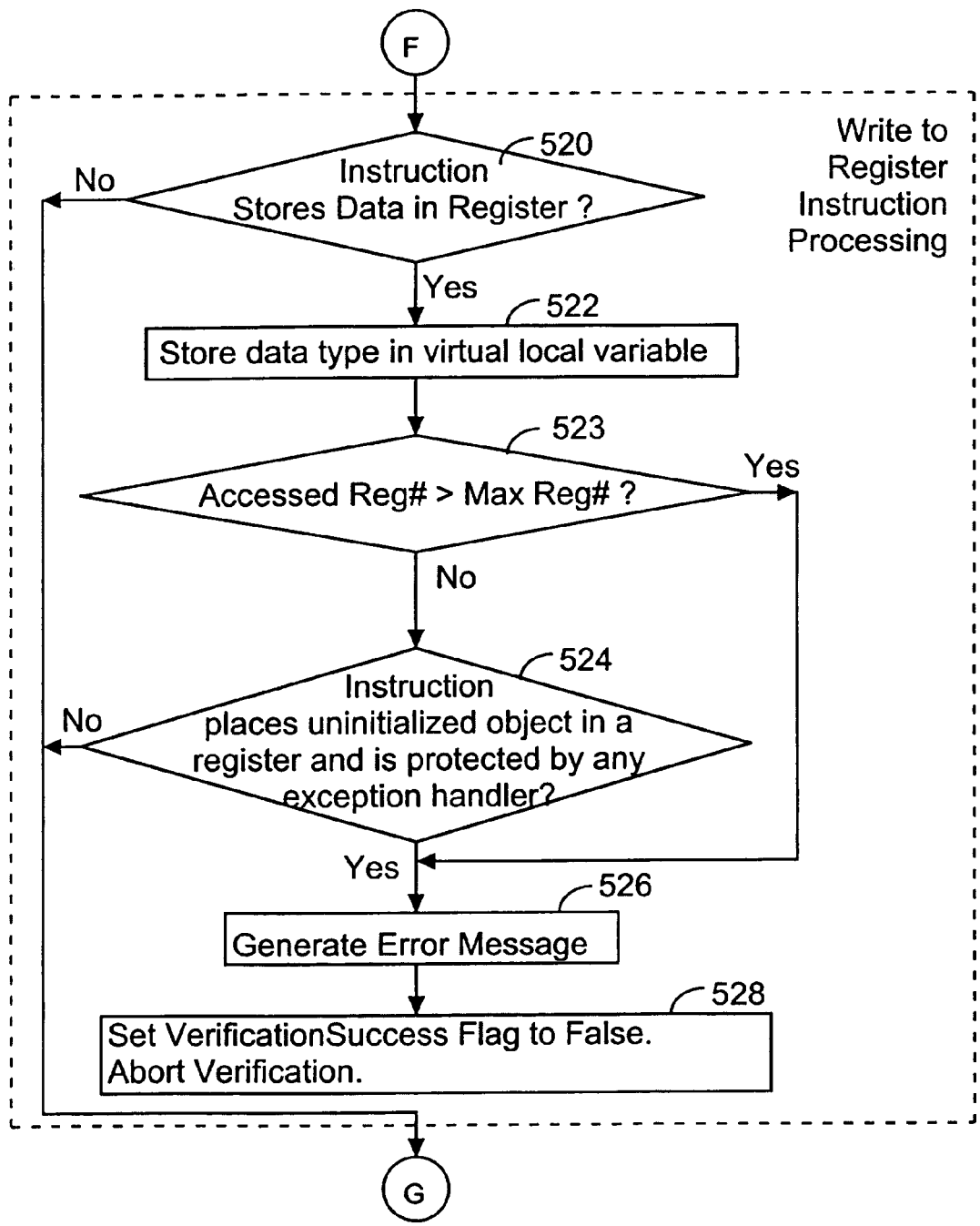

If the currently selected instruction does not read data from a register (510) or the data type comparison at step 512 results in a match and the register accessed is within the range of register numbers used by the method being verified (518), then the verifier continues processing the currently selected instruction at step 520 (FIG. 7F).

Referring to FIG. 7F, if the currently selected instruction stores data into a register (520), then the data type associated with the selected instruction is stored in the virtual register (522).

The verifier also checks to see if the register(s) to be written by the currently selected instruction has (have) a register number higher than the maximum register number for the method being verified (523). If so, an error message is generated (526) identifying the place in the program where the register access error occurred. The verifier will then set the VerificationSuccess flag to False and abort (528) the verification process.

Step 524 is discussed below with reference to the handling of uninitialized objects.

Figure 7G:
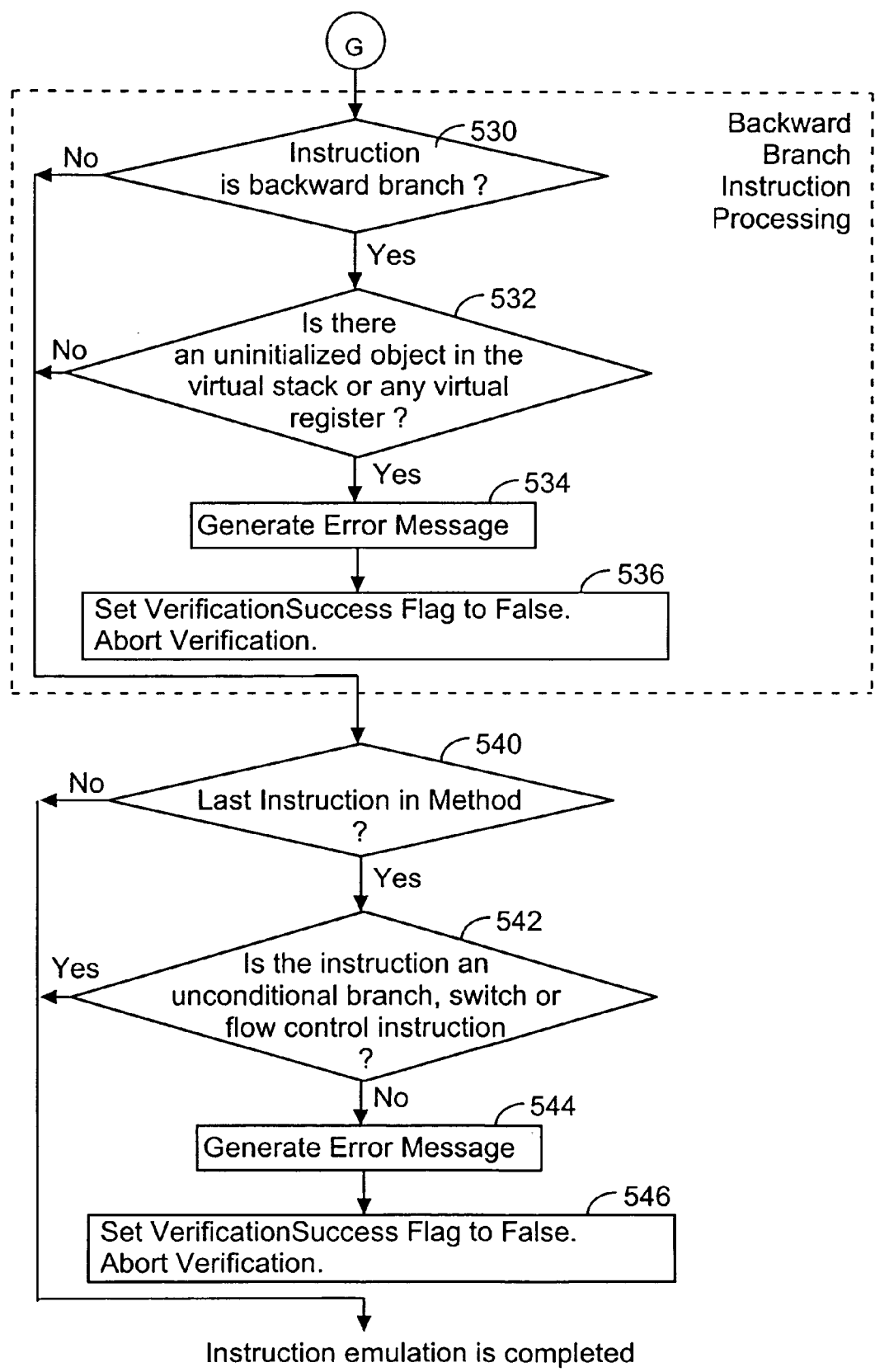

Referring to second half of FIG. 7G, if the selected instruction is the last instruction at the end of the method (540), it must be an unconditional jump, a tableswitch or lookupswitch instruction, or a flow control instruction (e.g., a return or a throw instruction) (542). Otherwise, the method will "fall off the end" when it is executed. If the last instruction is not one of these types of instructions, an error message is generated (544) identifying the place in the program where the register access error occurred. The verifier will then set the VerificationSuccess flag to False and abort (546) the verification process.

The first half of FIG. 7G is discussed below.

Successor Instruction Identification and Processing

Referring back now to FIG. 7B, if the instruction emulation resulted in the detection of an error, the verification process is halted (394, 382). Otherwise, the next step (390) is to determine the selected instruction's set of successor instructions. The "successor instructions" are defined to be all instructions that might be executed next after the currently selected instruction. The set of all successor instructions, includes:

(A) the next instruction in the method, if the current instruction is not an unconditional jump, a tableswitch or lookupswitch instruction, or a flow control instructions such as a throw instruction;
(B) the target of a conditional or unconditional branch, a tableswitch or lookupswitch instruction, or a flow control instructions such as a throw instruction; and
(C) all exception handlers for this instruction.

It is noted that the last instruction of most exception handlers is a "goto" instruction. More generally, the successor instruction for the end of an exception handler is simply the successor instruction for the last instruction of the exception handler.

As part of the successor instruction determination process, the verifier also checks to see if the program can simply "fall off" the current instruction (i.e., without having a legal next instruction. If so, this is a fatal error and the VerificationSuccess flag is set to False and the verification procedure is terminated (394, 382).

SnapShot Checking

After the successor instruction determination step (390), if the instruction has any successor instructions other than the next instruction in the method, the verifier next compares the derived map, which has been updated by emulation of the current instruction, with the snapshot stored in the map sub-attribute for each of those other successor instructions (392). If the map sub-attribute does not contain a snapshot entry for any of those successor instructions (other than the next instruction in the method), that is a fatal error for the fast verifier, and the verification process is halted and an error value is returned (394, 382).

During the snapshot comparison process, certain situations require special handling, as explained next.

If two corresponding virtual stack elements or two corresponding virtual register elements contain different object handles, but the data type in the derived map is a subtype of the data type in the snapshot, that is not an error condition because the class indicated in the snapshot is a superclass of the class indicated in the snapshot. If the data type in the derived map is not a subtype of the corresponding data type value in the snapshot, the two are incompatible, and that is flagged by the verifier as an error (394, 382).

An exception handler is a routine that protects a specified set of program code, called a protected code block. The exception handler is executed whenever the applicable exception gets thrown during execution of the corresponding protected code.

If a successor instruction is an exception handler, the virtual stack portion of the snapshot of the successor instruction should contain a single object of the exception type indicated by the exception handler information (i.e., the stored data type for the first virtual stack element indicates the object type of the exception handler, and thus should indicate the starting bytecode offset of the exception handler), and furthermore the stack counter of the snapshot of the successor instruction should be set to a value of 1. Therefore, when the fast verifier compares the virtual stack portion of a derived map with the virtual stack portion of the snapshot in a map sub-attribute for an exception handler in step 392, the fast verifier temporarily transforms the virtual stack portion of the derived map to contain just one entry, and then restores the stack portion of the derived map to its pre-transformed state after the processing of the exception handler instruction as a successor instruction is completed.

Alternately, while performing step 392 the fast verifier ignores all but one of the entries in the virtual stack portion of the derived map.

The virtual register information of the snapshot for the exception handler's first instruction contains data type values only for registers whose use is consistent throughout the protected code, and contains "unknown" indicators for all other registers used by the protected code.

Verification Considerations for New Object Formation and Initialization

Creating a usable object in the program interpreter is a multi-step process. A typical bytecode sequence for creating and initializing an object, and leaving it on top of the operand stack is:

```
new <myClass>        /*  allocate uninitialized space  */
dup                  /*  duplicate object on the stack */
<instructions for pushing arguments onto the stack>
invoke myClass.<init> /*  initialize       /*
```

The myClass initialization method, myClass.<init>, sees the newly initialized object as its argument in register 0. It must either call an alternative myClass initialization method or call the initialization method of a superclass of the object before it is allowed to do anything else with the object.

To prevent the use of uninitialized objects, and to prevent objects from being initialized more than once, the bytecode verifier pushes a special data type on the stack as the result of the opcode "new":

Data Type (=NewObject), ID of New Object Creation Instruction

This special data type indicates the instruction that created the new object. From inspection of that instruction the class type of the uninitialized object can be determined. When an initialization method is called on that object, all occurrences of this special data type on the virtual stack and in the virtual registers (i.e., all virtual stack and virtual registers that have the identical data type) are replaced by the appropriate, initialized data type.

During verification, the special data type for uninitialized objects is an illegal data type for any bytecode instruction to use, except for a call to an object initialization method for the appropriate object class. Thus, the verifier ensures that an uninitialized object cannot be used until it is initialized.

Similarly, the initialized object data type is an illegal data type for a call to an object initialization method. In this way the verifier ensures that an object is not initialized more than once.

One special check that the verifier must perform is that for every backwards branch, the verifier checks that there are no uninitialized objects on the stack or in a register. See steps 530, 532, 534, 536 in FIG. 7G. In addition, there may not be any uninitialized objects in a register in code protected by an exception handler. See steps 524, 526, 528 in FIG. 7F.

Otherwise, a devious piece of code could fool the verifier into thinking it had initialized an object when it had, in fact, initialized an object created in a previous pass through the loop. For example, an exception handler could be used to indirectly perform a backwards branch.

Second Embodiment

Reduced Size Map Attribute

As indicated above, testing by the inventor indicates that, on average, adding map sub-attributes to a class file increases its size, on average, but about five percent. While five percent is fairly small, it does increase the amount of time required to download a class file from a server to a client device. Also, since five percent is the average figure, there will be some class files whose size is increased by more than five percent by the addition of map sub-attributes. In a second preferred embodiment, described next, the overhead associated with the map sub-attributes is reduced to about one percent, on average.

The second embodiment is based on the following observations by the inventor. First, about ninety-five percent of the time, when the fast verifier compares the derived map with a snapshot in the map sub-attribute, the two are identical. Furthermore, as long as a target instruction is a successor for at least two predecessor instructions, and the derived map generated by emulation of all the predecessor instructions are identical, then comparing the derived map with the snapshot for this target instruction is the same thing as comparing the derived map after emulation of one predecessor instruction with the derived map for all the other predecessor instructions. While this latter insight may seem counter-intuitive, it provides an opportunity to move some of the overhead in the class file into the working memory of the client device, thereby keeping the class file very, very close to its original size.

Furthermore, the fast verifier of the second preferred embodiment is completely compatible with class files generated for the first embodiment. Therefore an authoring system can evaluate the working memory requirement associated with using the second embodiment, and if the working memory requirement exceeds the working memory available in some client devices, it can either (A) revert to the class files for the first embodiment—by inserting all target instruction snapshots in the map sub-attributes, or (B) it can partially reduce the number of snapshots in the map sub-attributes, so as to partially reduce the size of the modified class file, while keeping the working memory requirements compatible with all client devices that may need to use the class file.

Modified (Authoring System) Full Verifier for Second Embodiment

Figure 8:
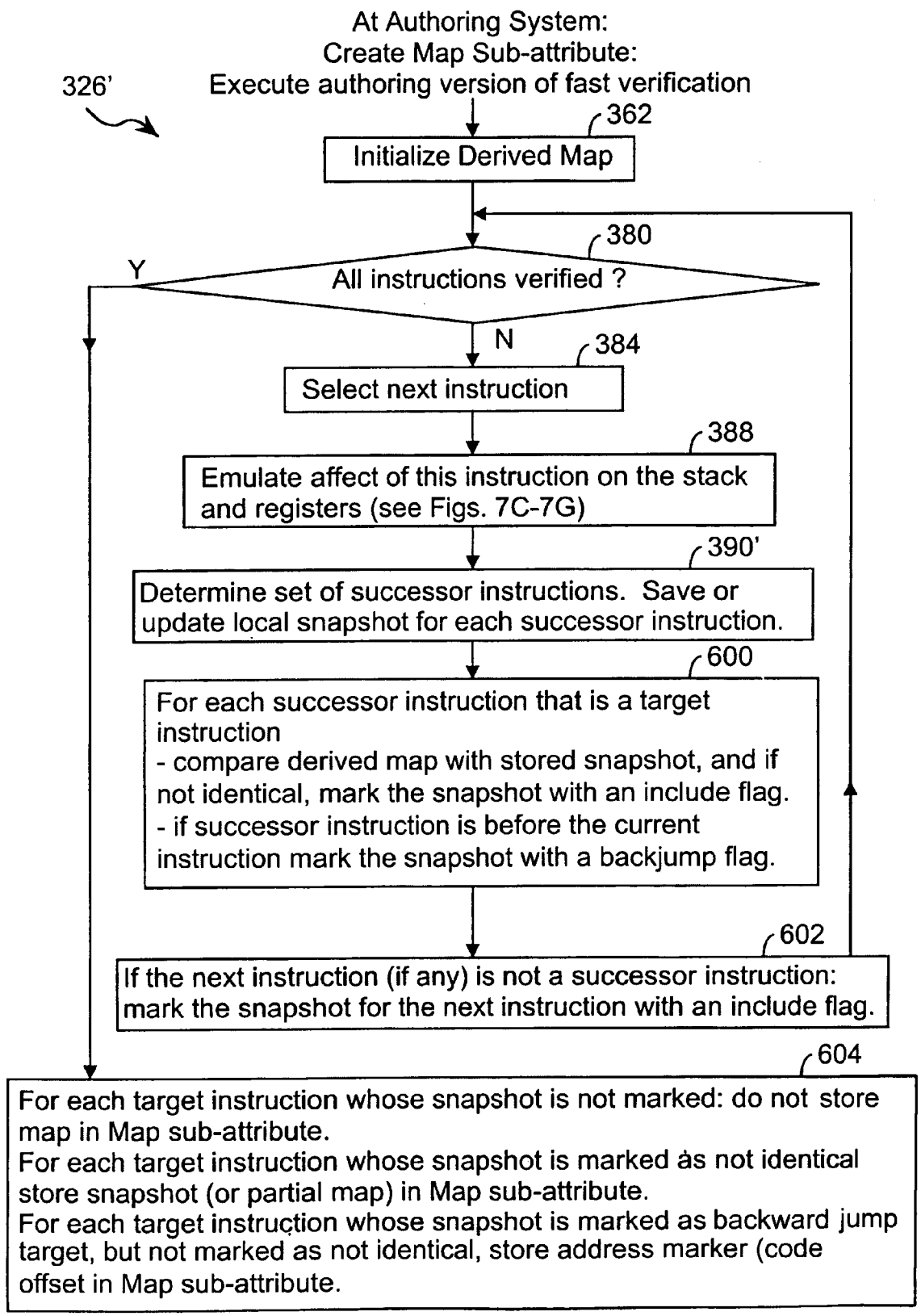
FIG. 8 is a flow chart of an alternate embodiment of the process for pre-verifying a program at an authoring system, which generates smaller modified program files (class files) than the first preferred embodiment.
Figure 9:
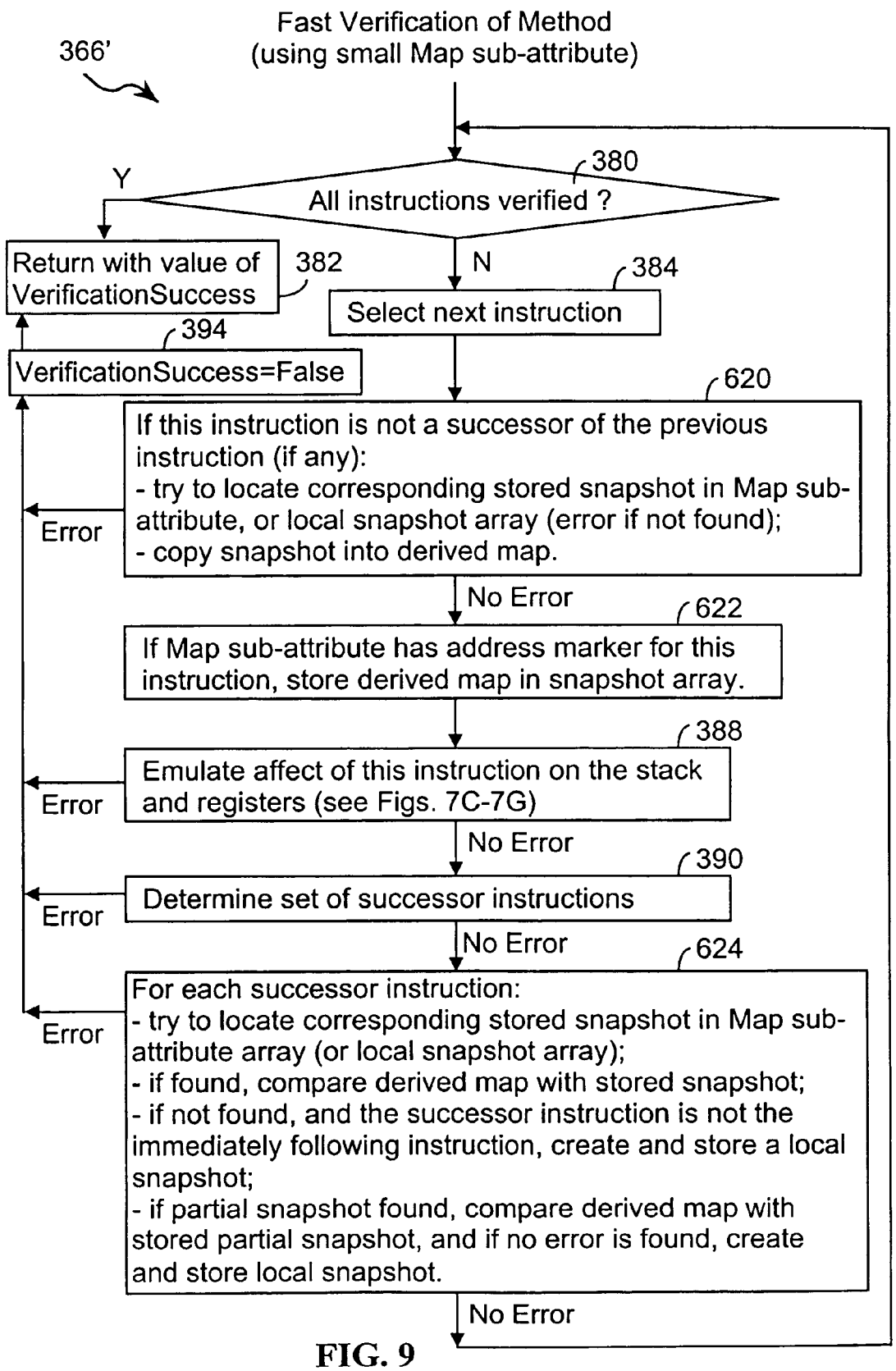
FIG. 9 is a flow chart of a memory efficient program verification process used by client devices in a second preferred embodiment of the present invention when the program being verified contains a space efficient version of the modified program generated using the process depicted in FIG. 8.

Referring to FIGS. 8 and 9, the second preferred embodiment involves fairly minor changes to both the authoring system and the client devices. FIG. 8 shows a flow chart of the authoring system procedure for pre-processing one selected method of a class file. This corresponds to a modified version of step 326 of FIG. 6. Each of the steps of the method verification procedure that is the same as corresponding steps in FIGS. 7A and 7B is given the same reference number in FIG. 8, and will not be described here. However, it should be noted that the full verifier performs a data flow analysis, unlike the single pass analysis of the verifier in the client devices. The details of the data flow analysis are not shown, but are implicitly included in steps 384, 388 and 390'. It is important to note, however, that the full verifier saves or updates the snapshot for each successor instruction (as well as for all other instructions in a preferred embodiment) in step 390', and thus those snapshots are available during step 600.

In step 600, snapshots are marked with one of two flags: an "include" flag for indicating that a snapshot should be included in the map sub-attribute, or a "backjump" flag for indicating the snapshot is for an instruction that is the target of a instruction later in the program.

New steps 600, 602 and 604 concern the generation of the map sub-attribute for a method. Once the successor instructions for a current instruction are determined in step 390', the full verifier compares the derived map with the stored snapshot for each target instruction, if any, that is a successor of the current instruction. If they are not identical, the snapshot is marked with the include flag. If the successor instruction is located before the current instruction, it is marked with the backjump flag (600).

Furthermore, if the next instruction in the program (if any) is not a successor instruction of the current instruction, the snapshot for that instruction is marked with an include flag (602). The reason for this, is that the next instruction must be a target/successor instruction of some other instruction. Note that if this next instruction is dead code, it will be detected by step 332 of FIG. 6, and the verification process will be aborted.

After all the instructions of the method have been verified (380), the snapshots created by the full verifier are inspected to see which ones are marked with include and backjump flags. If a snapshot is marked with both flags, the include flag supercedes the backjump flag. In particular, each snapshot which is marked with an include flag is stored in the map sub-attribute for the method, while each snapshot that is marked with the backjump flag but not the include flag has an "address marker" added to the map sub-attribute. The address marker consists of the offset for the instruction, but does not include the instruction's snapshot.

In a variation on the second embodiment, even more space can be saved as follows. In this variation, the full verifier keeps track of the number of predecessor instructions for each target instruction, and in particular, keeps track of which ones have at least two predecessor instructions. In addition, for each target instruction that is marked with an include flag and has at least two predecessor instructions, the full verifier stores a partial snapshot instead of a full snapshot, with the partial snapshot including the stack and register count values and data type information only for virtual stack entries and virtual registers that contain an object instance reference (i.e., data type 7 or 8) whose class is different for different predecessor instructions. All other data type information can be reconstructed by the fast verifier in the client devices by dynamically creating a snapshot from the derived map of the first predecessor instruction.

However, even when the object class associated with a virtual stack or register entry in the derived map for a target instruction is different for different predecessor instructions, if all the data types in the derived map for the first predecessor instruction to be encountered by the fast verifier are equal to or supertypes of the data types in the derived map(s) for the other predecessor instructions, then the snapshot for this target instruction does not need to be included in the map sub-attribute—because the snapshot dynamically constructed by the fast verifier will be consistent with the derived map of all the other predecessor instructions.

This variation on the second embodiment further increases the working memory requirements of the client devices, because the client device will need to store in working memory a completed version of each partial snapshot in the map sub-attribute.

In a second variation on the second embodiment, differential snapshots are stored in the map sub-attribute for those target instructions whose snapshot cannot be dynamically constructed by the fast verifier from the derived map of a predecessor instruction. A differential snapshot for a target instruction represents the difference between the derived map after emulation of a predecessor instruction (or the physically preceding instruction when the target instruction will be processed by the fast emulator before its first predecessor instruction) and the derived map that must be in place prior to emulation of the target instruction.

In another variation on the second embodiment, which can be combined with the first or second variants, the map sub-attribute is decreased in size by encoding the count values, offset values and data type values in the map sub-attribute using one byte whenever possible, instead of always using two bytes. Experiments by the inventor show that most of the time there are a very small number of local variables, the operand stack is almost always empty or has very few operands in it, and thus using two bytes to record the stack count value and two bytes to record the local variable count value is wasteful. Instead, one byte can be used to store small values between, say, 0 and 126, and three bytes (with the first set to a specific mark value, such as 127) can be used to store larger values. Other space efficient encodings, such as entropy encoding, could also be used. Experiments show that the one/three byte encoding for the stack and local variable count values reduces the average map sub-attribute size by twenty to thirty percent and thus reduces the average class size overhead attributable to the map sub-attribute from five percent to four percent.

Modified (Client) Fast Verifier for Second Embodiment

FIG. 9 shows a flow chart of the second embodiment of the client device's fast verifier procedure 120. This corresponds to a modified version of step 366 of FIG. 7A. Each of the steps of the method verification procedure that is the same as corresponding steps in FIG. 7A is given the same reference number in FIG. 14, and will not be described here.

In this embodiment, the fast verifier uses a local snapshot array 132 (FIG. 4), and stores in this array a snapshot for each target instruction for which a snapshot is not stored in the map sub-attribute of the method being verified. This includes instructions for which the map sub-attribute includes no information, as well as instructions for which the map sub-attribute only stores an address marker.

After a next instruction is selected in step 384, this embodiment of the fast verifier determines whether the current selected instruction is not a successor of the previous instruction (if any), and when this is true, it tries to locate a corresponding stored snapshot in the map sub-attribute for the method or in the local snapshot array (620). If it fails to find such an entry in the map sub-attribute or local snapshot array, this is a fatal error and the verifier aborts and returns an error value (620, 394, 382). If the snapshot is found in either location, it is copied into the derived map (620) and used as the derived map when emulating the current selected instruction (388). The reason that the snapshot for the current instruction may be found in the local snapshot array instead of the map sub-attribute is that the snapshot may be created when emulating an earlier instruction, such as jump or branch instruction, for which the current instruction was a successor instruction.

If there is an address marker in the map sub-attribute for the current instruction, then the derived map, as it exists prior to emulation of the current instruction, is copied into the local snapshot array (622). This snapshot will be used by the verifier at a later time, when emulating another instruction for which this instruction is a successor instruction.

After the current selected instruction has been emulated (388) and its successor instructions have been identified (390), the following processing is performed for each identified successor instruction (624). First, the verifier tries to locate a corresponding stored snapshot in either the map sub-attribute or the local snapshot array. If one is found, it compares the derived map with the snapshot. Each entry in the derived map must be equal to or a subtype of the corresponding entry of the snapshot. If not, they are inconsistent, and the verifier aborts and returns an error value (394, 382).

If the verifier does not find a snapshot for the successor instruction, and the successor instruction is not positioned immediately after the current instruction, then a snapshot for the successor instruction is created (by copying the derived map) and stored in the local snapshot array.

If the verifier finds an address marker for the successor instruction in the map sub-attribute, this is treated the same as not finding a snapshot for the successor instruction, in which case a snapshot for the successor instruction is created and stored.

If the verifier finds a partial snapshot for the successor instruction in the map sub-attribute (see above discussion of partial snapshots), the derived map is compared with the partial snapshot. In order for the comparison to not return an error, each entry in the partial snapshot must be equal to or a supertype of the corresponding entry in the derive map. If no error is found, the verifier creates a complete snapshot for the successor instruction and stores it in the local snapshot array. If an error is found, the verifier aborts and returns an error value (394, 382).

Multiple Mode Client Device Program Verifier

Figure 10:
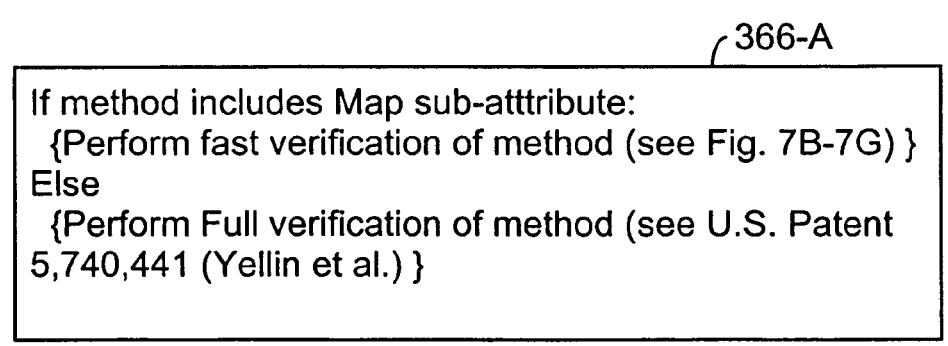
FIG. 10 is a flow chart of a program verification method that utilizes a fast verification methodology when the program being verified contains the supplemental information required to support fast verification, and otherwise uses a full verification method.

FIG. 10 is a flow chart of a program verification method that utilizes a fast verification methodology when the program being verified contains the supplemental information required to support fast verification, and otherwise uses a full verification method, such as the verification method disclosed by U.S. Pat. No. 5,740,441 (366-A). This verification method is suitable for use by client devices such as desktop computers and other computers that have sufficient memory and computational resources to perform the full verification method used by authoring systems, but instead of always performing the full verification method, take advantage of the fast verification method when a received class file contains the map sub-attribute for each method.

Alternate Embodiments

In an alternate embodiment, the inlining of subroutines and the creation of the map sub-attribute is performed by a compiler which compiles the source code programs for an object class into Java bytecode programs.

The fast verifier of the present invention may also be implemented in a compiler, such as a just-in-time compiler that compiles Java bytecode programs, or portions of such programs, into native code for direct execution by the client device's or system's underlying processor.

The present invention is also applicable to verifiers for other strongly data typed computer programming languages.

In an alternate embodiment, dead code is not automatically treated as an error. The authoring system simply ignores blocks of dead code (if any) in a method. When the fast verifier encounters an instruction after an unconditional jump, tableswitch, lookupswitch or flow control instruction that does not correspond to a snapshot or address marker in the map sub-attribute, that instruction is recorded as the first instruction of a block of dead code. The fast verifier skips over that instruction and all subsequent instructions until it encounters an instruction for which a snapshot or address marker is stored in the map sub-attribute (or for which a snapshot has been stored in the local snapshot array). The fast verifier keeps track of the beginning and end of each block of dead code. After verifying the last instruction of a method that contains at least one block of dead code, the verifier makes a second pass through the method looking for any instruction that could cause execution of the allegedly dead code. If any such instruction is found, the method is rejected by the fast verifier—because the allegedly dead code is not really dead code, and that code cannot be properly verified.

The present invention can be implemented as a computer program product that includes a computer program mechanism embedded in a computer readable storage medium. For instance, the computer program product could contain the program modules shown in FIG. 1. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

TABLE 1

BYTECODES IN JAVA LANGUAGE

| INSTRUCTION NAME | SHORT DESCRIPTION |
|---|---|
| nop | no operation |
| aconst_null | push null object |
| iconst_m1 | push integer constant −1 |
| iconst_0 | push integer constant 0 |
| iconst_1 | push integer constant 1 |
| iconst_2 | push integer constant 2 |
| iconst_3 | push integer constant 3 |
| iconst_4 | push integer constant 4 |
| iconst_5 | push integer constant 5 |
| lconst_0 | push long 0 L |
| lconst_1 | push long 1 L |
| fconst_0 | push float constant 0.0 |
| fconst_1 | push float constant 1.0 |
| fconst_2 | push float constant 2.0 |
| dconst_0 | push double float constant 0.0 d |
| dconst_1 | push double float constant 1.0 d |
| bipush | push byte-sized value |
| sipush | push two-byte value |
| ldc | load a constant from constant table (1 byte index) |

TABLE 1-continued

BYTECODES IN JAVA LANGUAGE

| INSTRUCTION NAME | SHORT DESCRIPTION |
|---|---|
| ldc_w | load a constant from constant table (2 byte index) |
| ldc2_w | load a 2-word constant . . . |
| iload | load local integer variable |
| lload | load local long variable |
| fload | load local floating variable |
| dload | load local double variable |
| aload | load local object variable |
| iload_0 | load local integer variable #0 |
| iload_1 | load local integer variable #1 |
| iload_2 | load local integer variable #2 |
| iload_3 | load local integer variable #3 |
| lload_0 | load local long variable #0 |
| lload_1 | load local long variable #1 |
| lload_2 | load local long variable #2 |
| lload_3 | load local long variable #3 |
| fload_0 | load local float variable #0 |
| fload_1 | load local float variable #1 |
| fload_2 | load local float variable #2 |
| fload_3 | load local float variable #3 |
| dload_0 | load lcl double float variable #0 |
| dload_1 | load lcl double float variable #1 |
| dload_2 | load lcl double float variable #2 |
| dload_3 | load lcl double float variable #3 |
| aload_0 | load local object variable #0 |
| aload_1 | load local object variable #1 |
| aload_2 | load local object variable #2 |
| aload_3 | load local object variable #3 |
| iaload | load from array of integer |
| laload | load from array of long |
| faload | load from array of float |
| daload | load from array of double |
| aaload | load from array of object |
| baload | load from array of (signed) bytes |
| caload | load from array of chars |
| saload | load from array of (signed) shorts |
| istore | store local integer variable |
| lstore | store local long variable |
| fstore | store local float variable |
| dstore | store local double variable |
| astore | store local object variable |
| istore_0 | store local integer variable #0 |
| istore_1 | store local integer variable #1 |
| istore_2 | store local integer variable #2 |
| istore_3 | store local integer variable #3 |
| lstore_0 | store local long variable #0 |
| lstore_1 | store local long variable #1 |
| lstore_2 | store local long variable #2 |
| lstore_3 | store local long variable #3 |
| fstore_0 | store local float variable #0 |
| fstore_1 | store local float variable #1 |
| fstore_2 | store local float variable #2 |
| fstore_3 | store local float variable #3 |
| dstore_0 | store lcl double float variable #0 |
| dstore_1 | store lcl double float variable #1 |
| dstore_2 | store lcl double float variable #2 |
| dstore_3 | store lcl double float variable #3 |
| astore_0 | store local object variable #0 |
| astore_1 | store local object variable #1 |
| astore_2 | store local object variable #2 |
| astore_3 | store local object variable #3 |
| iastore | store into array of int |
| lastore | store into array of long |
| fastore | store into array of float |
| dastore | store into array of double float |
| aastore | store into array of object |
| bastore | store into array of (signed) bytes |
| castore | store into array of chars |
| sastore | store into array of (signed) shorts |
| pop | pop top element |
| pop2 | pop top two elements |
| dup | dup top element |
| dup_x1 | dup top element. Skip one |
| dup_x2 | dup top element. Skip two |
| dup2 | dup top two elements. |

TABLE 1-continued

BYTECODES IN JAVA LANGUAGE

| INSTRUCTION NAME | SHORT DESCRIPTION |
|---|---|
| dup2_x1 | dup top 2 elements. Skip one |
| dup2_x2 | dup top 2 elements. Skip two |
| swap | swap top two elements of stack. |
| iadd | integer add |
| ladd | long add |
| fadd | floating add |
| dadd | double float add |
| isub | integer subtract |
| lsub | long subtract |
| fsub | floating subtract |
| dsub | floating double subtract |
| imul | integer multiply |
| lmul | long multiply |
| fmul | floating multiply |
| dmul | double float multiply |
| idiv | integer divide |
| ldiv | long divide |
| fdiv | floating divide |
| ddiv | double float divide |
| irem | integer mod |
| lrem | long mod |
| frem | floating mod |
| drem | double float mod |
| ineg | integer negate |
| lneg | long negate |
| fneg | floating negate |
| dneg | double float negate |
| ishl | shift left |
| lshl | long shift left |
| ishr | shift right |
| lshr | long shift right |
| iushr | unsigned shift right |
| lushr | long unsigned shift right |
| iand | boolean and |
| land | long boolean and |
| ior | boolean or |
| lor | long boolean or |
| ixor | boolean xor |
| lxor | long boolean xor |
| iinc | increment lcl variable by constant |
| i2l | integer to long |
| i2f | integer to float |
| i2d | integer to double |
| l2i | long to integer |
| l2f | long to float |
| l2d | long to double |
| f2i | float to integer |
| f2l | float to long |
| f2d | float to double |
| d2i | double to integer |
| d2l | double to long |
| d2f | double to float |
| int2byte | integer to byte |
| int2char | integer to character |
| int2short | integer to signed short |
| lcmp | long compare |
| fcmpl | float compare. −1 on incomparable |
| fcmpg | float compare. 1 on incomparable |
| dcmpl | dbl floating cmp. −1 on incomp |
| dcmpg | dbl floating cmp. 1 on incomp |
| ifeq | goto if equal |
| ifne | goto if not equal |
| iflt | goto if less than |
| ifge | goto if greater than or equal |
| ifgt | goto if greater than |
| ifle | goto if less than or equal |
| if_icmpeq | compare top two elements of stack |
| if_icmpne | compare top two elements of stack |
| if_icmplt | compare top two elements of stack |
| if_icmpge | compare top two elements of stack |
| if_icmpgt | compare top two elements of stack |
| if_icmple | compare top two elements of stack |
| if_acmpeq | compare top two objects of stack |
| if_acmpne | compare top two objects of stack |

TABLE 1-continued

BYTECODES IN JAVA LANGUAGE

| INSTRUCTION NAME | SHORT DESCRIPTION |
|---|---|
| goto | unconditional goto |
| jsr | jump subroutine |
| ret | return from subroutine |
| tableswitch | goto (case) |
| lookupswitch | goto (case) |
| ireturn | return integer from procedure |
| lreturn | return long from procedure |
| freturn | return float from procedure |
| dreturn | return double from procedure |
| areturn | return object from procedure |
| return | return (void) from procedure |
| getstatic | get static field value. |
| putstatic | assign static field value |
| getfield | get field value from object. |
| putfield | assign field value to object. |
| invokevirtual | call method, based on object. |
| invokenonvirtual | call method, not based on object. |
| invokestatic | call a static method. |
| invokeinterface | call an interface method |
| new | Create a new object |
| newarray | Create a new array of non-objects |
| anewarray | Create a new array of objects |
| arraylength | get length of array |
| athrow | throw an exception |
| checkcast | error if object not of given type |
| instanceof | is object of given type? |
| monitorenter | enter a monitored region of code |
| monitorexit | exit a monitored region of code |
| wide | prefix operation. |
| multianewarray | create multidimensional array |
| ifnull | goto if null |
| ifnonnull | goto if not null |
| goto_w | unconditional goto. four byte offset |
| jsr_w | jump subroutine. four byte offset |
| breakpoint | call breakpoint handler |

What is claimed is:

1. A method of operating a computer system, comprising:
(A) storing a program in a memory, the program including a sequence of instructions, where each of a multiplicity of the instructions represents an operation on data of a specific data type; said each instruction having associated data type restrictions on the data type of data to be manipulated by said each instruction;
(B) processing the program to determine whether execution of any instruction in the program would violate the data type restrictions for that instruction and generating a first fault signal when execution of any instruction in the program would violate the data type restrictions for that instruction;
the program processing including:
(B1) determining a subset of the instructions, comprising target instructions, that are successor instructions of conditional jump, unconditional jump, branch and flow control instructions;
(B2) generating, for at least one target instruction in the program, a data type snapshot, the data type snapshot including data type information for at least one datum stored in an operand stack or a local variable prior to execution of the at least one target instruction;
(B3) determining for an identified target instruction whether a set of selection criteria are met, the set of selection criteria including whether the identified target instruction is a successor to at least two distinct predecessor instructions of the program and whether the data types associated with data stored in the operand stack and local variables by the program immediately after execution of all the predecessor instructions are identical; and (B4) when the determination for the identified target instruction is negative, storing the snapshot for the identified target instruction in an array of supplemental information, and when the determination is positive, determining whether the identified target instruction is the target of any predecessor instruction positioned later in the program than the identified target instruction, and when this determination is positive, storing information identifying the identified target instruction in the array of supplemental information; and (C) when the first fault signal is not generated, storing in the memory a modified version of the program having the array of supplemental information that includes the data type snapshot generated for at least one of the target instructions of the program;

wherein the supplemental information includes data type snapshots only for instructions determined to be target instructions.

2. The method of claim 1, further including:

identifying subroutines and subroutine calls, if any, in the program and converting the identified subroutines and subroutine calls into inline instructions, thereby generating a version of the program that includes no subroutines and subroutine calls, whereby the modified program includes no subroutines and subroutine calls.

3. The method of claim 1, further including:

distributing the modified program to a client device;

at the client device, prior to execution of the modified program, preprocessing the modified program to verify that execution of the program will not violate the data type restrictions and generating a second fault signal when execution of any instruction in the modified program would violate the data type restrictions for that instruction;

the pre-processing of the modified program including:

emulating the operation of the instructions in the modified program and determining whether each emulated instruction would violate the data type restrictions for that instruction, including, when the modified program includes a data type snapshot for the instruction being emulated, comparing a data type value generated by said emulating with a corresponding data type in the data type snapshot, and generating the second fault signal when the generated and corresponding data types are inconsistent with each other.

4. The method of claim 3, wherein the emulating, performed at the client device, includes, when emulating an instruction of the modified program that has a successor instruction for which the modified program includes a data type snapshot, generating a current data type snapshot, comparing the current data type snapshot with the data type snapshot in the modified program and generating the second fault signal when the current data type snapshot and the data type snapshot in the modified program are inconsistent with each other.

5. The method of claim 4, wherein the emulating, performed at the client device, includes determining whether executing of any instruction in the modified program would result in an operand stack underflow or overflow, and whether execution of any loop in the modified program would result in a net addition or deletion of operands to the operand stack, and generating the second fault signal when the execution of the modified program would result in an operand stack underflow or overflow and when execution of any loop in the modified program would produce a net addition or deletion of operands to the operand stack.

6. The method of claim 5, including emulating, at the client device, each instruction in the modified program exactly once, in a predefined linear order starting at the beginning of the program and continuing in the predefined linear order without regard to actual order in which the instructions of the modified program would be executed during execution thereof.

7. The method of claim 5, including when the preprocessing of the modified program results in the generation of no second fault signals, enabling execution of the modified program;

when the preprocessing of the program results in the generation of the second fault signal, preventing execution of the modified program; and when execution of the modified program has been enabled, executing the modified program without performing data type checks on operands stored in the operand stack during execution of the modified program.

8. The method of claim 4, wherein the emulating of the modified program includes:

when the modified program includes information identifying the instruction being emulated but does not include a data type snapshot for the instruction being emulated, (A) generating and storing in a memory array a data type snapshot for the instruction being emulated, unless a data type snapshot for the instruction has already been stored in the memory array by the emulating step, and (B) when a data type snapshot for the instruction has already been stored in the memory array by the emulating step, comparing a data type value generated by said emulating with a corresponding data type in the data type snapshot in the memory array, and generating the second fault signal when the generated and corresponding data types are inconsistent with each other.

9. The method of claim 8, wherein the emulating of the modified program further includes:

when the instruction being emulated is a conditional jump, unconditional jump, branch instruction or flow control instructions and any successor instruction of the instruction being emulated is at a position later in the program than the instruction immediately following the instruction being emulated, (A) generating and storing a data type snapshot in the memory array for each successor instruction of the instruction being emulated that is at a position later in the program than the instruction immediately following the instruction being emulated and for which there is not already a data type snapshot stored in the memory array, and (B) otherwise, for each successor instruction of the instruction being emulated that is at a position later in the program than the instruction immediately following the instruction being emulated and for which there is already a data type snapshot stored in the memory array, generating a current data type snapshot, comparing the current data type snapshot with the data type snapshot stored in the memory array for the successor instruction, and generating the second fault signal when the current data type snapshot and the data type snapshot stored in the memory array for the successor instruction are inconsistent.

10. A computer program product for use in conjunction with a computer system, the computer program product comprising a computer readable storage medium and a computer program mechanism embedded therein, the computer program mechanism comprising:
   an authoring module for storing a program in a memory in the computer system, the program including a sequence of instructions, where each of a multiplicity of the instructions represents an operation on data of a specific data type; said each instruction having associated data type restrictions on the data type of data to be manipulated by said each instruction;
   a program pre-processing module, including:
      program emulation instructions that generate a first fault signal when execution of any instruction in the program would violate the data type restrictions for that instruction;
      target instruction identification instructions for determining a subset of the instructions, comprising target instructions, that are successor instructions of conditional jump, unconditional jump, branch and flow control instructions; and
      snapshot instructions for generating, for at least one target instruction in the program, a data type snapshot, the data type snapshot including data type information for at least one datum stored in an operand stack or a local variable prior to execution of the at least one target instruction; and
      modified program generation instructions that, when the first fault signal is not generated, store in the memory a modified version of the program having an array of supplemental information that includes the data type snapshot generated for at least one of the target instructions of the program, wherein the supplemental information includes data type snapshots only for instructions determined to be target instructions;
   wherein the snapshot instructions include
      instructions for determining for an identified target instruction whether a set of selection criteria are met, the set of selection criteria including whether the identified target instruction is a successor to at least two distinct predecessor instructions of the program and whether the data types associated with data stored in the operand stack and local variables by the program immediately after execution of all the predecessor instructions are identical; and
      instructions for storing the snapshot for the identified target instruction in the array of supplemental information when the determination for the identified target instruction is negative, and when the determination is positive, for determining whether the identified target instruction is the target of any predecessor instruction positioned later in the program than the identified target instruction, and when this determination is positive, for storing information identifying the identified target instruction in the array of supplemental information.

11. The computer program product of claim 10, wherein the program pre-processing module includes subroutine miming instructions that identify subroutines and subroutine calls, if any, in the program and convert the identified subroutines and subroutine calls into inline instructions, thereby generating a version of the program that includes no subroutines and subroutine calls, whereby the modified program includes no subroutines and subroutine calls.

12. A computer program product for use in conjunction with a computer controlled apparatus, the computer program product comprising a computer readable storage medium and a computer program mechanism embedded therein, the computer program mechanism comprising:
   a communications module for receiving a program and storing it in a memory in the computer controlled apparatus, the program including a sequence of instructions, where each of a multiplicity of the instructions represents an operation on data of a specific data type; said each instruction having associated data type restrictions on the data type of data to be manipulated by said each instruction; the received program including an array of supplemental information that includes a data type snapshot for at least one of the instructions of the program, the data type snapshot including data type information for at least one datum stored in an operand stack or a local variable prior to execution of the at least one of the instructions;
   wherein the supplemental information in the received program includes data type snapshots only for instructions determined to be target instructions, the target instructions comprising successor instructions of conditional jump, unconditional jump, branch and flow control instructions, if any, in the program; and
   a program pre-processing module, including:
      program emulation instructions that generate a fault signal when execution of any instruction in the program would violate the data type restrictions for that instruction, including:
         instructions for determining whether the program includes a data type snapshot for the instruction being emulated, comparing a data type value generated by the program emulation instructions with a corresponding data type in the data type snapshot, and generating the fault signal when the generated and corresponding data types are inconsistent with each other; and
         instructions, activated when the instruction being emulated is a last instruction of a method, for generating the fault signal when the instruction being emulated is not one of an unconditional jump, a switch instruction, and a flow control instruction.

13. The computer program product of claim 12, wherein the program emulation instructions include instructions, activated when emulating an instruction of the program that has a successor instruction for which the modified program includes a data type snapshot, for generating a current data type snapshot, comparing the current data type snapshot with the data type snapshot in the program and generating the fault signal when the current data type snapshot and the data type snapshot in the modified program are inconsistent with each other.

14. The computer program product of claim 13, wherein the program emulation instructions include instructions for determining whether executing of any instruction in the program would result in an operand stack underflow or overflow, and whether execution of any loop in the program would result in a net addition or deletion of operands to the operand stack, and generating the fault signal when the execution of the program would result in an operand stack underflow or overflow and when execution of any loop in the program would produce a net addition or deletion of operands to the operand stack.

15. The computer program product of claim 14, wherein the program emulation instructions include instructions for emulating each instruction in the program exactly once, in a predefined linear order starting at the beginning of the program and continuing in the predefined linear order without regard to actual order in which the instructions of the program would be executed during execution thereof.

16. The computer program product of claim 14, including instructions for preventing execution of the program when the preprocessing module generates the fault signal, and for enabling execution of the program when the preprocessing module does not generate the fault signal; and
a program execution module for executing the program without performing data type checks on operands stored in the operand stack and in local variables during execution of the modified program.

17. The computer program product of claim 14, wherein the program emulation instructions include instructions, activated when the array of supplemental information for the program includes information identifying the instruction being emulated but does not include a data type snapshot for the instruction being emulated, for (A) generating and storing in a memory array a data type snapshot for the instruction being emulated, unless a data type snapshot for the instruction has already been stored in the memory array, and (B) when a data type snapshot for the instruction has already been stored in the memory array by the emulation instructions, comparing a data type value generated by said emulation instructions with a corresponding data type in the data type snapshot in the memory array, and generating the fault signal when the generated and corresponding data types are inconsistent with each other.

18. The computer program product of claim 14, wherein the program emulation instructions further include instructions, activated when the instruction being emulated is a conditional jump, unconditional jump, branch instruction or flow control instruction and any successor instruction of the instruction being emulated is at a position later in the program than the instruction immediately following the instruction being emulated, for (A) generating and storing a data type snapshot in the memory array for each successor instruction of the instruction being emulated that is at a position later in the program than the instruction immediately following the instruction being emulated and for which there is not already a data type snapshot stored in the memory array, and (B) otherwise, for each successor instruction of the instruction being emulated that is at a position later in the program than the instruction immediately following the instruction being emulated and for which there is already a data type snapshot stored in the memory array, generating a current data type snapshot, comparing the current data type snapshot with the data type snapshot stored in the memory array for the successor instruction, and generating the fault signal when the current data type snapshot and the data type snapshot stored in the memory array for the successor instruction are inconsistent.

19. A computer system, comprising:
memory for storing a program, the program including a sequence of instructions, where each of a multiplicity of said instructions each represents an operation on data of a specific data type; said each instruction having associated data type restrictions on the data type of data to be manipulated by said each instruction;
a data processing unit for executing programs stored in the memory;
a program pre-processing module, executable by the data processing unit, including:
program emulation instructions that generate a first fault signal when execution of any instruction in the program would violate the data type restrictions for that instruction;
target instruction identification instructions for determining a subset of the instructions, comprising target instructions, that are successor instructions of conditional jump, unconditional jump, branch and flow control instructions; and
snapshot instructions for generating, for at least one target instruction in the program, a data type snapshot, the data type snapshot including data type information for at least one datum stored in an operand stack or a local variable prior to execution of the at least one target instruction; and
modified program generation instructions that, when the first fault signal is not generated, store in the memory a modified version of the program having an array of supplemental information that includes the data type snapshot generated for at least one of the target instructions of the program, wherein the supplemental information includes data type snapshots only for instructions determined to be target instructions;
wherein the snapshot instructions include
instructions for determining for an identified target instruction whether a set of selection criteria are met, the set of selection criteria including whether the identified target instruction is a successor to at least two distinct predecessor instructions of the program and whether the data types associated with data stored in the operand stack and local variables by the program immediately after execution of all the predecessor instructions are identical; and
instructions for storing the snapshot for the identified target instruction in the array of supplemental information when the determination for the identified target instruction is negative, and when the determination is positive, for determining whether the identified target instruction is the target of any predecessor instruction positioned later in the program than the identified target instruction, and when this determination is positive, for storing information identifying the identified target instruction in the array of supplemental information.

20. The computer system of claim 19, wherein the program pre-processing module includes subroutine inlining instructions that identify subroutines and subroutine calls, if any, in the program and convert the identified subroutines and subroutine calls into inline instructions, thereby generating a version of the program that includes no subroutines and subroutine calls, whereby the modified program includes no subroutines and subroutine calls.

21. A computer controlled apparatus, comprising:
memory;
a data processing unit for executing programs stored in the memory;
a communications module, executable by the data processing unit, for receiving a program and storing it in a memory in the computer controlled apparatus, the program including a sequence of instructions, where each of a multiplicity of the instructions represents an operation on data of a specific data type; said each instruction having associated data type restrictions on the data type of data to be manipulated by said each instruction; the received program including an array of supplemental information that includes a data type snapshot for at least one of the instructions of the program, the data type snapshot including data type information for at least one datum stored in an operand stack or a local variable prior to execution of the at least one of the instructions;

wherein the supplemental information in the received program includes data type snapshots only for instructions determined to be target instructions, the target instructions comprising successor instructions of conditional jump, unconditional jump, branch and flow control instructions, if any, in the program; and a program pre-processing module, executable by the data processing unit, including:

program emulation instructions that generate a fault signal when execution of any instruction in the program would violate the data type restrictions for that instruction, including instructions for determining whether the program includes a data type snapshot for the instruction being emulated, comparing a data type value generated by the program emulation instructions with a corresponding data type in the data type snapshot, and generating the fault signal when the generated and corresponding data types are inconsistent with each other; and instructions, activated when the instruction being emulated is a last instruction of a method, for generating the fault signal when the instruction being emulated is not one of an unconditional jump, a switch instruction, and a flow control instruction.

22. The computer controlled apparatus of claim 21, wherein the program emulation instructions include instructions, activated when emulating an instruction of the program that has a successor instruction for which the modified program includes a data type snapshot, for generating a current data type snapshot, comparing the current data type snapshot with the data type snapshot in the program and generating the fault signal when the current data type snapshot and the data type snapshot in the modified program are inconsistent with each other.

23. The computer controlled apparatus of claim 22, wherein the program emulation instructions include instructions for determining whether executing of any instruction in the program would result in an operand stack underflow or overflow, and whether execution of any loop in the program would result in a net addition or deletion of operands to the operand stack, and generating the fault signal when the execution of the program would result in an operand stack underflow or overflow and when execution of any loop in the program would produce a net addition or deletion of operands to the operand stack.

24. The computer controlled apparatus of claim 23, wherein the program emulation instructions include instructions for emulating each instruction in the program exactly once, in a predefined linear order starting at the beginning of the program and continuing in the predefined linear order without regard to actual order in which the instructions of the program would be executed during execution thereof.

25. The computer controlled apparatus of claim 23, including instructions for preventing execution of the program when the preprocessing module generates the fault signal, and for enabling execution of the program when the preprocessing module does not generate the fault signal; and a program execution module for executing the program without performing data type checks on operands stored in the operand stack and in local variables during execution of the modified program.

26. The computer controlled apparatus of claim 23, wherein the program emulation instructions include instructions, activated when the array of supplemental information for the program includes information identifying the instruction being emulated but does not include a data type snapshot for the instruction being emulated, for (A) generating and storing in a memory array a data type snapshot for the instruction being emulated, unless a data type snapshot for the instruction has already been stored in the memory array, and (B) when a data type snapshot for the instruction has already been stored in the memory array by the emulation instructions, comparing a data type value generated by said emulation instructions with a corresponding data type in the data type snapshot in the memory array, and generating the fault signal when the generated and corresponding data types are inconsistent with each other.

27. The computer controlled apparatus of claim 23, wherein the program emulation instructions further include instructions, activated when the instruction being emulated is a conditional jump, unconditional jump, branch instruction or flow control instruction and any successor instruction of the instruction being emulated is at a position later in the program than the instruction immediately following the instruction being emulated, for (A) generating and storing a data type snapshot in the memory array for each successor instruction of the instruction being emulated that is at a position later in the program than the instruction immediately following the instruction being emulated and for which there is not already a data type snapshot stored in the memory array, and (B) otherwise, for each successor instruction of the instruction being emulated that is at a position later in the program than the instruction immediately following the instruction being emulated and for which there is already a data type snapshot stored in the memory array, generating a current data type snapshot, comparing the current data type snapshot with the data type snapshot stored in the memory array for the successor instruction, and generating the fault signal when the current data type snapshot and the data type snapshot stored in the memory array for the successor instruction are inconsistent.

* * * * *